US011147425B2

(12) United States Patent
Windmeisser

(10) Patent No.: US 11,147,425 B2
(45) Date of Patent: Oct. 19, 2021

(54) SERVICE SYSTEM

(71) Applicant: Diversey, Inc., Charlotte, NC (US)

(72) Inventor: Dieter Windmeisser, Fruthwilen (CH)

(73) Assignee: Diversey, Inc., Fort Mill, SC (US)

(*) Notice: Subject to any disclaimer, the term of this patent is extended or adjusted under 35 U.S.C. 154(b) by 649 days.

(21) Appl. No.: 16/081,521

(22) PCT Filed: Mar. 3, 2017

(86) PCT No.: PCT/EP2017/055001
§ 371 (c)(1),
(2) Date: Aug. 31, 2018

(87) PCT Pub. No.: WO2017/149116
PCT Pub. Date: Sep. 8, 2017

(65) Prior Publication Data
US 2021/0177228 A1  Jun. 17, 2021

Related U.S. Application Data

(60) Provisional application No. 62/302,844, filed on Mar. 3, 2016.

(51) Int. Cl.
*A47L 11/30* (2006.01)
*A47L 11/40* (2006.01)

(52) U.S. Cl.
CPC .......... *A47L 11/30* (2013.01); *A47L 11/4005* (2013.01)

(58) Field of Classification Search
CPC ...... A47L 11/30; A47L 11/4005; A47L 11/29; B60S 5/00
See application file for complete search history.

(56) References Cited

U.S. PATENT DOCUMENTS 5,572,759 A   11/1996  Zachhuber
5,890,258 A    4/1999  Lee
(Continued)

FOREIGN PATENT DOCUMENTS

CN   201572046 U   9/2010
CN   103685451 U   3/2014
(Continued)

OTHER PUBLICATIONS

International Search Report and Written Opinion of International Application No. PCT/EP2017/055001 dated May 29, 2017.
(Continued)

*Primary Examiner* — Dung Van Nguyen
(74) *Attorney, Agent, or Firm* — Andrew R. Aranda; Diversey, Inc.

(57) ABSTRACT

A service station and a service process for servicing cleaning machines are provided, the service station comprising a first inlet line including an electric conduit and configured to connect to a power source, a second inlet line including a fluid conduit and configured to connect to a cleaning liquid source, a control unit, a charging unit electrically connected to the first inlet line and to the control unit, the charging unit being configured to provide a charging current, a first flow controller fluidly connected to the second inlet line, a first supply line electrically connected to the charging unit and configured to receive the charging current and to deliver the charging current to a first connector plug for providing the charging current to the machine to be serviced, a second supply line fluidly connected to the first flow controller and to a second connector plug for providing cleaning liquid to the machine to be serviced. The control unit is configured to control the first flow controller to cause delivery of cleaning liquid from the second inlet line to the second supply line and to control the charging unit to supply the charging current to the first supply line. A cleaning machine and a system comprising a service station and one or more cleaning machines is also provided.

20 Claims, 14 Drawing Sheets

(56) References Cited

U.S. PATENT DOCUMENTS

| | | | |
|---|---|---|---|
| 6,105,203 A | 8/2000 | Hueppi et al. | |
| 2012/0000021 A1* | 1/2012 | Chignoli | A47L 11/4061 |
| | | | 15/3 |
| 2013/0095246 A1* | 4/2013 | Pollack | A47L 11/4055 |
| | | | 427/322 |
| 2013/0193041 A1 | 8/2013 | Rohde | |
| 2014/0130292 A1* | 5/2014 | Pedlar | A47L 11/4027 |
| | | | 15/320 |
| 2014/0157533 A1 | 6/2014 | Windmeisser et al. | |
| 2015/0014228 A1 | 1/2015 | Lee et al. | |
| 2015/0265123 A1* | 9/2015 | Chen | A47L 11/4008 |
| | | | 340/679 |
| 2016/0037983 A1* | 2/2016 | Hillen | A47L 9/2847 |
| | | | 134/6 |

FOREIGN PATENT DOCUMENTS

| | | |
|---|---|---|
| DE | 42 30 197 A1 | 3/1994 |
| DE | 101 42 192 C1 | 3/2003 |
| TW | 511292 B | 11/2015 |

OTHER PUBLICATIONS

Office Action of counterpart Chinese Patent Application No. 201780014647.1 dated Jun. 11, 2020; 7 pages.

* cited by examiner

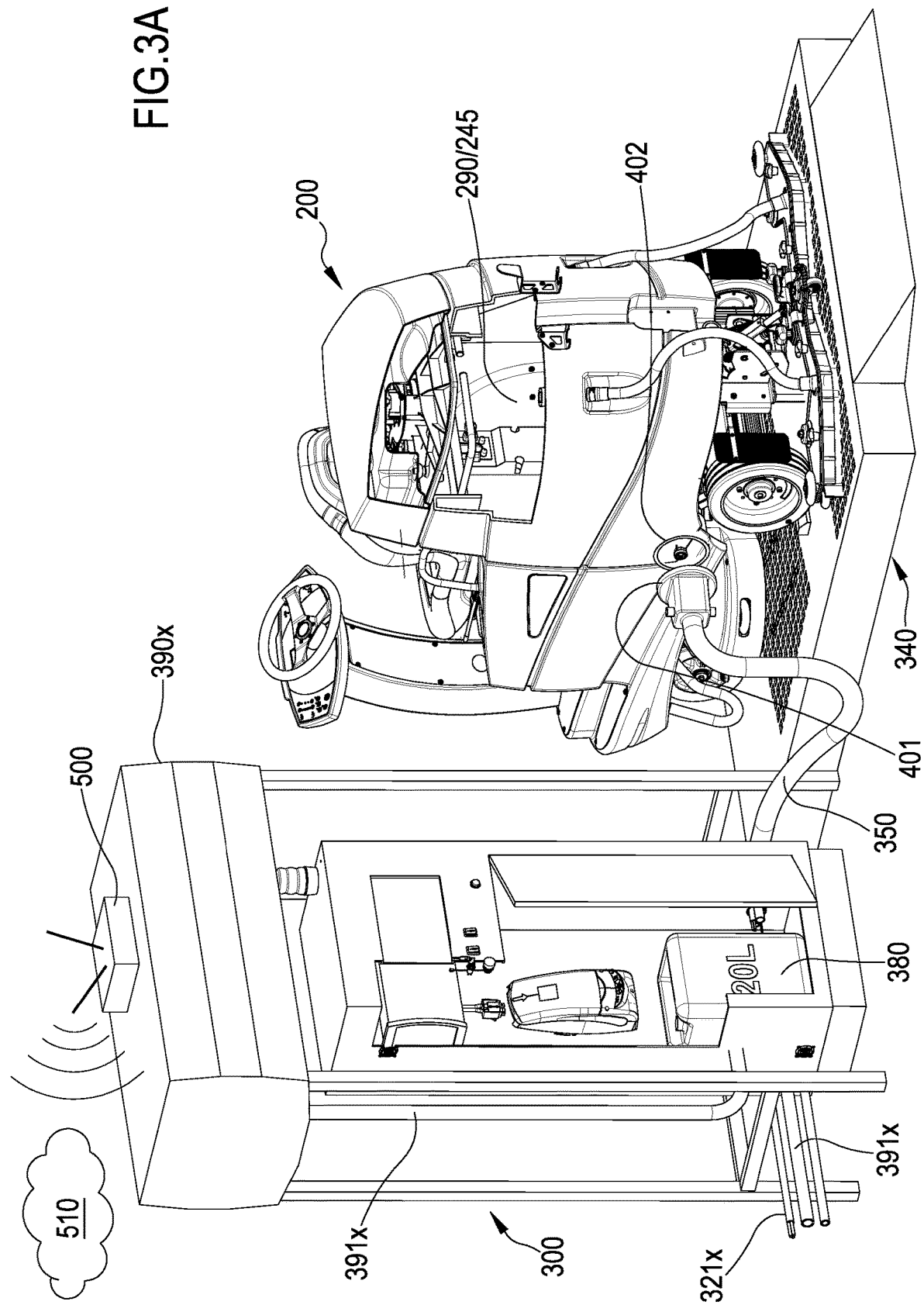

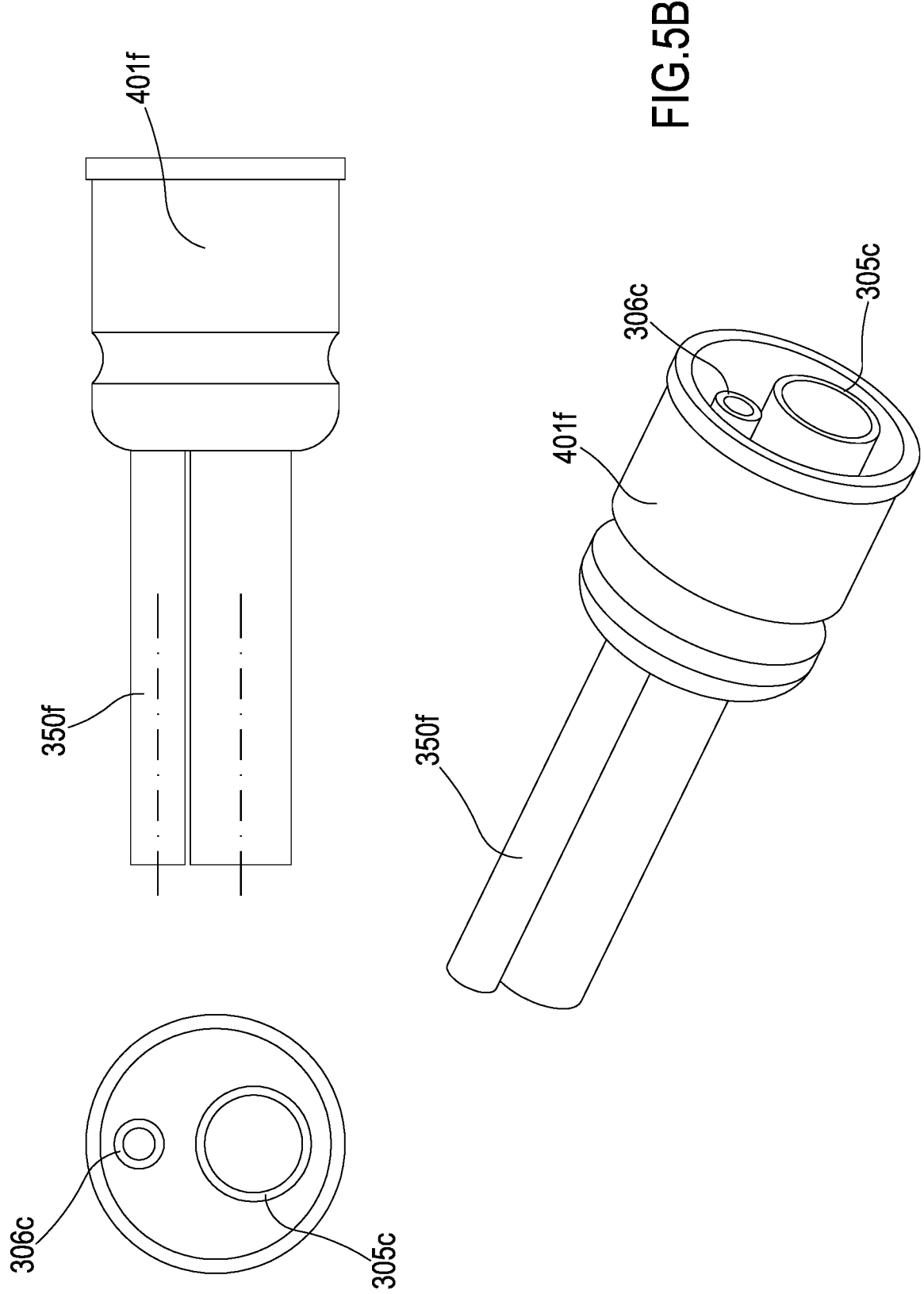

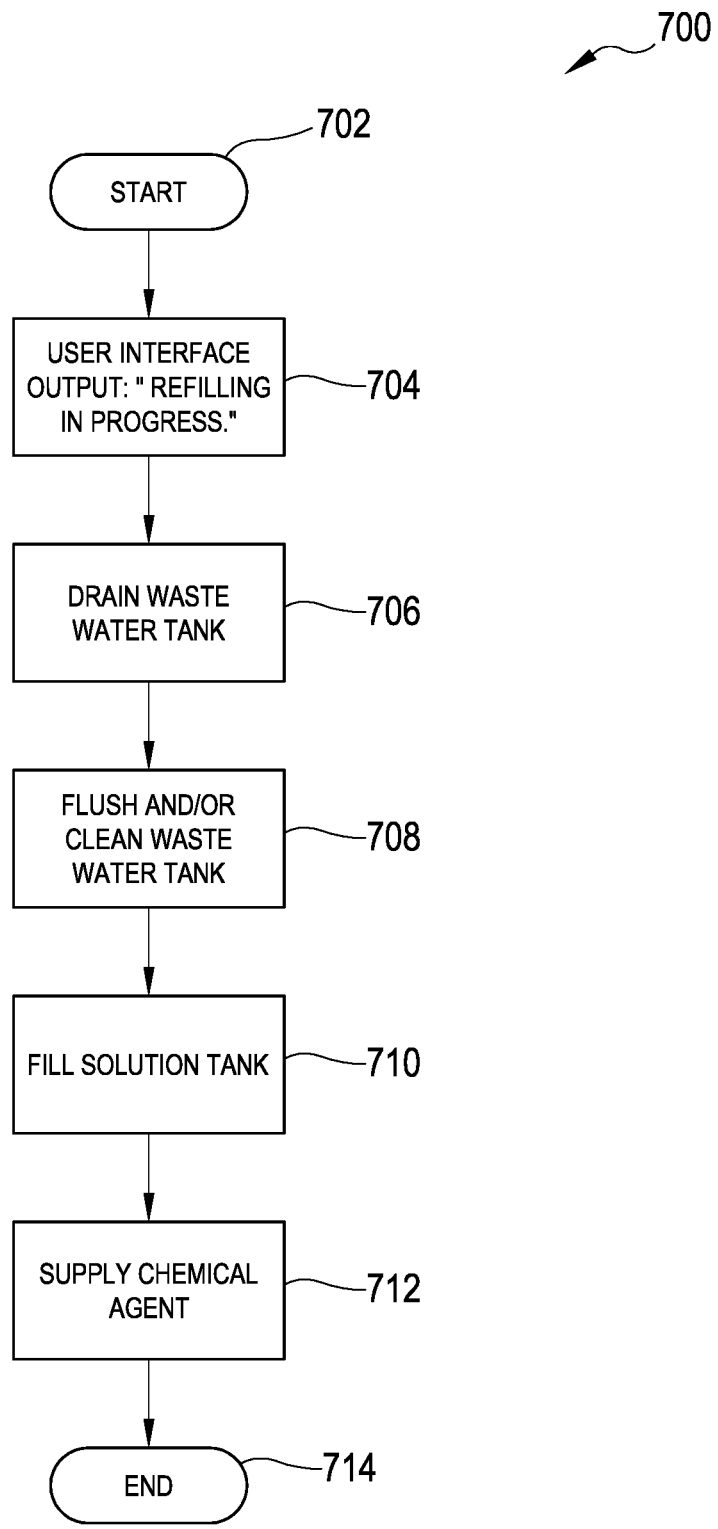

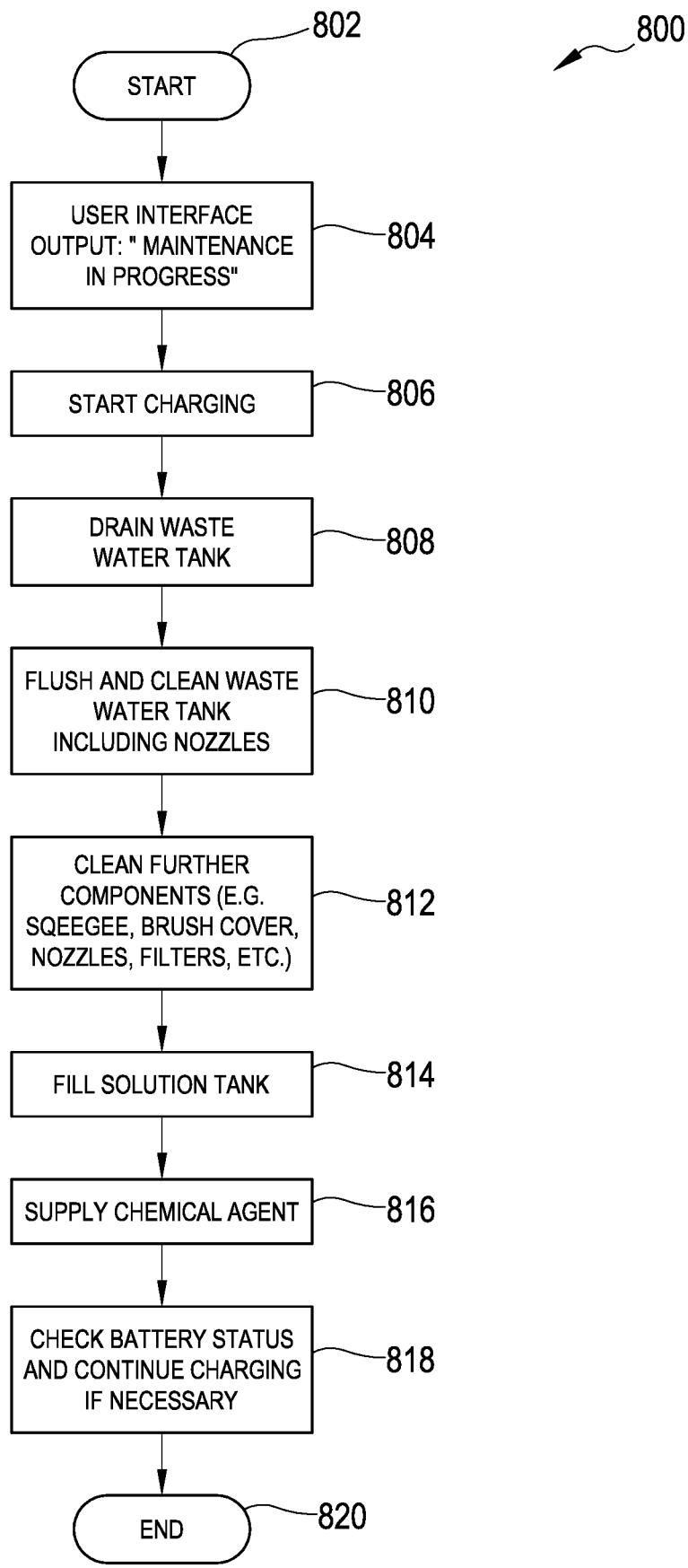

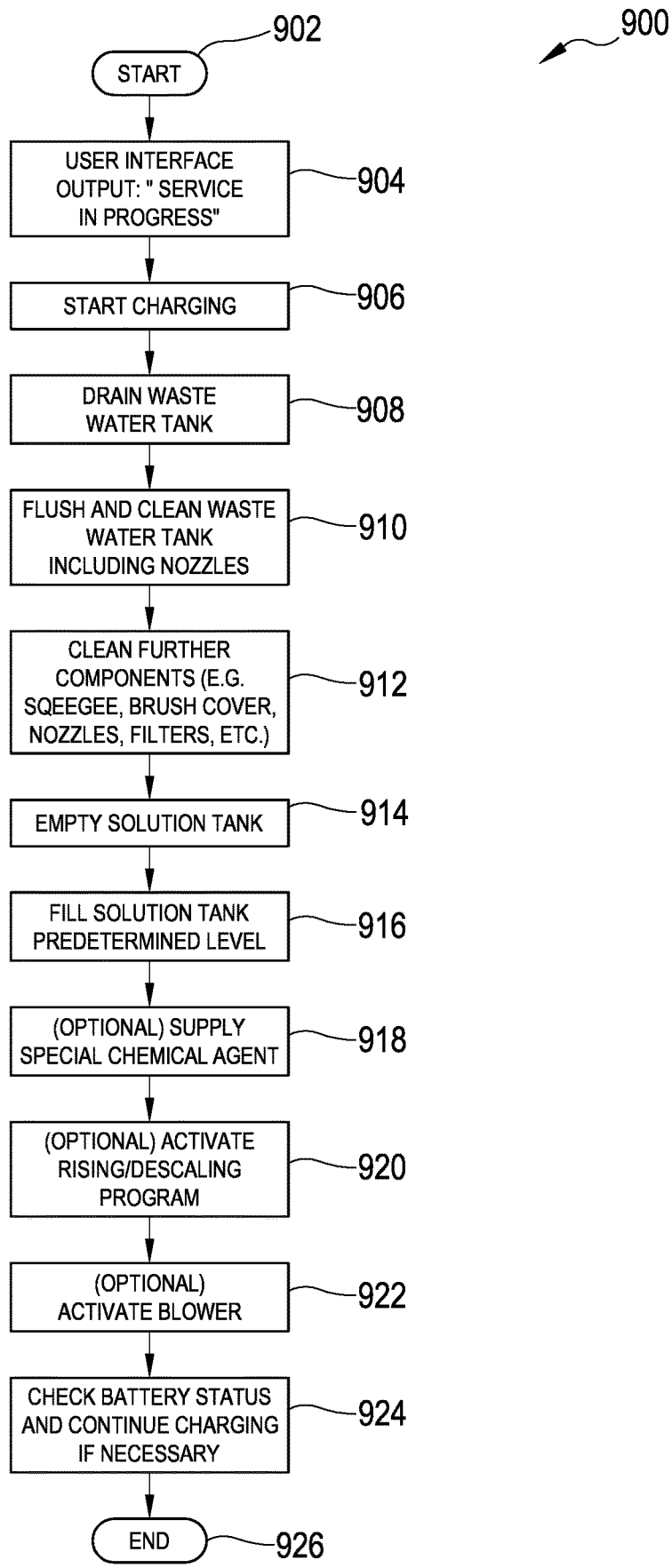

SERVICE SYSTEM

CROSS REFERENCE TO RELATED APPLICATIONS

This application is a National Stage Application, filed under 35 U.S.C. § 371, of International Application No. PCT/EP2017/055001, filed Mar. 3, 2017, which claims priority to U.S. Application No. 62/302,844, filed Mar. 3, 2016; the contents of both of which are hereby incorporated by reference in their entirety.

TECHNICAL FIELD

The present disclosure relates to servicing of machines. An example service system includes one or more service lines and service connectors configured to connect to one or more machines and a plurality of supply and/or disposal components. The service line or lines include fluid conduits for supply/disposal of fluids. The service line or lines further include electrical conduits for supply of electrical energy and for establishing a data connection, for example for data transfer and for remotely controlling machine functions. An example service process includes supplying energy and/or operating materials to a machine and further includes disposal of waste materials.

BACKGROUND ART

Machines are used in a variety of scenarios, typically in order to economically and efficiently perform tasks that otherwise would have to be performed manually. In turn, the machines have to be serviced and maintained to remain in an operable state. One category of machines includes machines for cleaning floor surfaces in which the machines have to be regularly serviced to supply the necessary operating materials, for example liquids and cleaning agents, and to dispose of waste materials, for example waste water and debris. As these machines typically run on battery power, energy must also be supplied on a regular basis.

U.S. Pat. No. 6,105,203 discloses a floor cleaning machine for wet cleaning of a floor surface that comprises a solution tank for storing fresh cleaning solution, a waste water tank for storing used cleaning solution, a cleaning member for performing a cleaning action using the cleaning solution, and a suction unit for collecting used cleaning solution and dirt from the cleaning surface. U.S. 2014/0157533 discloses a floor cleaning tool including a housing, a reservoir coupled to the housing and adapted to hold a cleaning solution, and a floor-engaging roller coupled to the housing and rotatable with respect to the housing. The tool also includes a wheel by which the floor cleaning tool moves across a floor surface in a direction of travel at least partially defining a front, rear, and lateral sides of the floor cleaning tool. The tool further includes a squeegee laterally insertable between the roller and the wheel, and a squeegee mount located between the roller and the wheel by which the squeegee is releasably mounted to the floor cleaning tool by first and second laterally opposed protrusions rotatably secured within first and second apertures at opposite ends of the squeegee. Other similar machines are known in the art.

Cleaning machines typically operate for a limited amount of time, before either the stored amount of energy and/or cleaning solution runs low or the container for collecting the used cleaning solution operates close to its maximum capacity. In such cases, the cleaning process is interrupted and an operator manually performs a series of steps depending upon the service or maintenance situation. In order to service the machine, the operator brings the machine to a suitable location, for example where used cleaning solution can be disposed of and/or where fresh cleaning solution can be obtained. Some scenarios require the operator to travel a substantial distance to reach a suitable location, for example on larger premises such as shopping malls or in industrial settings. During these travel times and during the service itself, the machine cannot be used for the intended purpose and overall efficiency and/or active operating time are reduced.

During service, the operator typically has to manually perform a series of steps in a particular order, so that the service is done properly and efficiently. In some examples, the operator has to drain and flush the tank for used cleaning solution and has to remove any debris or dirt picked up or collected by the cleaning member, the suction unit, and the tank. Further, the cleaning solution tank must be re-filled and, typically at the same time, the correct amount of the right cleaning agent has to be supplied. Also, if the battery level is too low to continue operation, the battery has to be recharged, for example by manually connecting a charging unit integrated into the machine to an electrical outlet or by connecting a stand-alone charging unit with the machine and activating it.

If the individual series of steps necessary to service the machine is not followed meticulously and in the correct order, substantial problems can arise. For example, very often fresh cleaning solution is prepared using an incorrect amount of a chemical agent and/or not the right chemical agent. In other cases, debris or dirt collected in the machine is not properly cleaned out, thus posing a risk to fluid lines, valves, filters, etc., which can easily get clogged or malfunction. The same applies to debris and/or dirt introduced into the tanks through the service openings by accident or negligence. Moreover, if charging facilities are not designed fool-proof, it may be possible to connect an unsuitable charger to the machine or to select an unsuitable charging profile, potentially detrimental to the charger, the battery, the charging time, the battery life and/or the maximum capacity of the battery.

Further, the need for manual interaction during service and/or maintenance requires a substantial investment in human resources. During the service, an operator cannot perform the job that they are originally paid to do and some productivity is lost.

Therefore, there is a need for an apparatus and a method that facilitate substantially automated servicing of machines.

An aim of the present invention is to provide a service station for servicing machines autonomously, efficiently, and/or economically. A further aim of the present invention is to provide a machine that is configured to connect to a service station for autonomous, efficient, and/or economical servicing. A still further aim of the present invention is to provide a system including a service station and a machine, where the service station is configured for servicing the machine autonomously, efficiently, and/or economically.

Another aim of the present invention is to provide a method for servicing machines autonomously, efficiently, and/or economically. In particular, an aim of the present invention is to provide a method for servicing a machine in at least one of the following modes: refilling, maintenance, and service.

SUMMARY OF INVENTION

According to the invention, in a 1st aspect there is provided a service station for servicing machines, comprising a first inlet line including an electric conduit and configured to connect to a power source; a second inlet line including a fluid conduit and configured to connect to a cleaning liquid source; a control unit; a charging unit electrically connected to the first inlet line and to the control unit, the charging unit being configured to provide a charging current; a first flow controller fluidly connected to the second inlet line; a first supply line electrically connected to the charging unit and configured to receive the charging current and to deliver the charging current to a first connector plug for providing the charging current to the machine to be serviced; a second supply line fluidly connected to the first flow controller and to a second connector plug for providing cleaning liquid to the machine to be serviced; wherein the control unit is configured to control the first flow controller to cause delivery of cleaning liquid from the second inlet line to the second supply line; and control the charging unit to supply the charging current to the first supply line.

In a $2^{nd}$ aspect according to the $1^{st}$ aspect, the service station further comprises a service assembly having a first service connector plug configured to connect to a corresponding first service connector socket of a machine to be serviced.

In a $3^{rd}$ aspect according to the $2^{nd}$ aspect, the first service connector plug is configured to house the first connector plug and the second connector plug, optionally wherein the service assembly is configured to house the first supply line and the second supply line in a main supply conduit.

In a $4^{th}$ aspect according to any one of aspects 1 to 3, the first flow controller comprises a valve configured to put the second inlet line and the second supply line into fluid communication; and optionally wherein controlling the first flow controller to cause delivery of cleaning liquid from the second inlet line to the second supply line comprises controlling the valve to allow flow of liquid based on a pressure differential between a pressure in the second inlet line and a pressure in the second supply line.

In a $5^{th}$ aspect according to any one of aspects 1 to 3, the first flow controller comprises a first pump configured to deliver cleaning liquid from the second inlet line to the second supply line; and optionally wherein controlling the first flow controller to cause delivery of cleaning liquid from the second inlet line to the second supply line comprises controlling the first pump to deliver liquid from the second inlet line to the second supply line.

In a $6^{th}$ aspect according to any one of aspects 1 to 5, the service station further comprises a cleaning agent container configured to receive a cleaning agent; wherein the first flow controller is further fluidly connected to the cleaning agent container; and the control unit is further configured to control the first flow controller to add a predetermined amount of cleaning agent to the cleaning liquid provided to the second supply line.

In a $7^{th}$ aspect according to any one of aspects 1 to 6, the service station further comprises a supply fluid flow controller configured to selectively prevent fluid flow through the second supply line if the second connector plug is not connected to a corresponding second connector socket of a machine to be serviced, optionally the supply fluid flow controller being operatively associated with one of the second connector plug and the second supply line.

In an $8^{th}$ aspect according to the $7^{th}$ aspect, the supply fluid flow controller comprises a check valve, and/or wherein the supply fluid flow controller is configured to selectively prevent fluid flow from the second supply line to the second connector plug.

In a $9^{th}$ aspect according to any one of aspects 1 to 8 in combination with aspect 2, the service station further comprises the first connector plug is configured to connect to a first connector socket of the first service connector socket; and the second connector plug is configured to connect to a second connector socket of the first service connector socket.

In a $10^{th}$ aspect according to the $9^{th}$ aspect, the first and second connector plugs are configured such that, when the service connector plug is connected to the service connector socket of a machine, the first connector plug connects to the first connector socket before the second connector plug connects to the second connector socket.

In an $11^{th}$ aspect, in accordance with any one of aspects 1 and 4 to 8 not in combination with aspects 2 or 3, the service assembly comprises a second service connector plug configured to connect to a corresponding second service connector socket of a machine to be serviced; the first service connector plug is configured to house the first connector plug and the second service connector plug is configured to house the second connector plug; and the first supply line and the second supply line are configured as separate first and second supply conduits, the first supply line being operatively associated to the first service connector plug and the second supply line being operatively associated to the second connector plug.

In a $12^{th}$ aspect in accordance with the $11^{th}$ aspect, the service station further comprises a first locking mechanism configured to selectively allow or prevent connection and disconnection of the first service connector; wherein the control unit is configured to control the first locking mechanism to prevent disconnection of the first service connector when the second service connector is connected, and to allow connection and disconnection of the first service connector when the second service connector is not connected.

In a $13^{th}$ aspect according to any one of aspects 11 or 12, the service station further comprises a second locking mechanism configured to selectively allow or prevent connection and disconnection of the second service connector; wherein the control unit is configured to control the second locking mechanism to prevent connection of the second service connector when the first service connector is not connected, and to allow connection and disconnection of the second service connector when the first service connector is connected.

In a $14^{th}$ aspect according to any one of aspects 1 to 13, the second inlet line is configured to connect to a water source, preferably the water source being one of a water pipe of a building and a water tank.

In a $15^{th}$ aspect according to any one of aspects 1 to 14, the first inlet line is connected to an electrical power source, preferably the electrical power source being a mains supply of a building.

In a $16^{th}$ aspect according to any one of aspects 1 to 15, the service station further comprises a cleaning liquid buffer container arranged on the second inlet line and configured to receive a predetermined amount of cleaning liquid and to supply the predetermined amount of cleaning liquid to the first flow controller; preferably the cleaning liquid buffer container being arranged vertically above the first flow controller in order allow for cleaning liquid to flow from the cleaning liquid buffer container towards and/or through the first flow controller.

In a $17^{th}$ aspect according to any one of aspects 1 to 16, the service station further comprises a first outlet line including a fluid conduit and configured to connect to a drain; and a receptacle fluidly connected to the first outlet line and configured to receive cleaning liquid discharged from the machine to be serviced.

In an 18$^{th}$ aspect according to any one of aspects 1 to 17, the service station further comprises a second flow controller fluidly connected to the second inlet line; wherein the service assembly further includes a third supply line fluidly connected to the second flow controller and to a third connector plug for providing cleaning liquid to the machine to be serviced; and wherein the control unit is further configured to control the second flow controller to cause delivery of cleaning liquid from the second inlet line to the third supply line.

In a 19$^{th}$ aspect according to the 18$^{th}$ aspect, the control unit is further configured to control the first flow controller to provide cleaning liquid to the second supply line at a first pressure; and to control the second flow controller to provide cleaning liquid to the third supply line at a second pressure; and wherein the second pressure is higher than the first pressure; optionally wherein the first pressure ranges between about 1.5 bar and about 10 bar, preferably between about 3 bar and about 5 bar; and the second pressure ranges between about 2 bar and about 200 bar, preferably between about 10 bar and about 100 bar.

In a 20$^{th}$ aspect according to any one of aspects 1 to 19, the service assembly further includes a fourth supply line connected to a fourth connector plug, the control unit being connected to the fourth supply line, the fourth supply line being configured to enable data communication between the control unit and the machine to be serviced.

In a 21$^{st}$ aspect according to the 20$^{th}$ aspect, the fourth supply line corresponds to one of: a USB connection, a CAN bus connection, and an Ethernet connection.

In a 22$^{nd}$ aspect according to any one of aspects 1 to 21, the service station further comprises a wireless communications unit; wherein the control unit is connected to the wireless communications unit, the wireless communications unit being configured to enable data communication between the control unit and the machine to be serviced.

In a 23$^{rd}$ aspect according to the 22$^{nd}$ aspect, the wireless communications unit corresponds to one of: a Bluetooth adapter, a Wireless Ethernet adapter, and an RFID reader/writer.

In a 24$^{th}$ aspect according to any one of aspects 1 to 23, the control unit is further configured for determining that a connection to a machine to be serviced is established; determining that a machine user interface of the machine to be serviced is disabled; receiving a selected service process; performing a series of service steps based on the selected service process; and determining, at the control unit, whether all steps of the series of steps have been performed.

In a 25$^{th}$ aspect according to the 24$^{th}$ aspect, the step of determining whether all steps of the series of steps have been performed further comprises the step of preparing the disconnection of the machine to be serviced from the service station; optionally further comprising the step of disconnecting the service connector plug from the service connector socket.

In a 26$^{th}$ aspect according to aspect 25 in combination with aspect 2, the step of preparing the disconnection of the machine to be serviced from the service station further comprises the step of disconnecting the service connector plug from the service connector socket.

In a 27$^{th}$ aspect according to aspects 25 or 26, the step of preparing the disconnection of the machine to be serviced from the service station further comprises the step of enabling the machine user interface when a disconnection has been determined.

In a 28$^{th}$ aspect according to any one of aspects 24 to 27 in combination with aspect 2, the step of determining that a connection to a machine to be serviced is established further comprises the step of determining that the first service connector plug is connected to the first service connector socket.

In a 29$^{th}$ aspect according to any one of aspects 24 to 28, the step of determining that the machine user interface of the machine to be serviced is disabled further comprises the step of controlling the machine control unit to cause disabling of the machine user interface.

According to the invention, in a 30$^{th}$ aspect there is provided a machine for cleaning floor surfaces, comprising a machine control unit; a machine user interface; a battery; a first container configured to receive cleaning liquid and fluidly connected to a first discharge line, the first discharge line being configured to discharge fluid from the first container; a first discharge flow controller arranged on the first discharge line and configured to selectively enable and disable fluid flow through the first discharge line; a second container configured to receive used cleaning liquid and fluidly connected to a second discharge line, the second discharge line being configured to discharge fluid from the second container; a second discharge flow controller arranged on the second discharge line and configured to selectively enable and disable fluid flow through the second discharge line; a first connector socket connected to a first service line, the first service line being electrically connected to the battery and configured to provide a charging current received at the first connector socket to the battery; and a second connector socket connected to a second service line, the second service line being fluidly connected to the first container and configured to provide a cleaning liquid received at the second connector socket to the first container; wherein the machine control unit is configured to determine whether a first service connector plug is connected to the first service connector socket, and, when a connection has been determined, to disable the machine user interface; receive a control signal from the service station; and control, based on the control signal, one ore more of: the first discharge flow controller, the second discharge flow controller, the machine user interface.

In a 31$^{st}$ aspect according to the 30$^{th}$ aspect, the machine further comprises a first service connector socket configured to connect to a corresponding first service connector plug of a service station.

In a 32$^{nd}$ aspect according to the 31$^{st}$ aspect, the first service connector socket is configured to house the first connector socket and the second connector socket.

In a 33$^{rd}$ aspect according to any one of aspects 30 to 32, the control signal comprises a first control signal and wherein the machine control unit is further configured to control the first discharge flow controller to enable or disable fluid flow through the first discharge line based on the first control signal.

In a 34$^{th}$ aspect according to any one of aspects 30 to 33, the control signal comprises a second control signal and wherein the machine control unit is further configured to control the second discharge flow controller to enable or disable fluid flow through the second discharge line based on the second control signal.

In a 35$^{th}$ aspect according to any one of aspects 30 to 34, the control signal comprises a third control signal and wherein the machine control unit is further configured to enable or disable the machine user interface based on the third control signal.

In a 36th aspect according to any one of aspects 30 to 35, the machine further comprises a wireless communication unit in data communication with the machine control unit, wherein the machine control unit is configured to receive the control signal via the wireless communication unit.

In a 37th aspect according to any one of aspects 30 to 36, the machine further comprises a service fluid flow controller configured to selectively prevent fluid flow through the second service line if the second connector socket is not connected to a corresponding second connector plug of a service station, optionally the service fluid flow controller being operatively associated with one of the second connector socket and the second service line In a 38th aspect according to the 37th aspect, the service fluid flow controller comprises a check valve, and/or wherein the service fluid flow controller is configured to selectively prevent fluid flow from the second service line to the second connector socket.

In a 39th aspect according to any one of aspects 31, or 33 to 38 not in combination with aspect 32, the machine further comprises a second service connector socket configured to connect to a corresponding second service connector plug of a service station; wherein the first connector socket is operatively associated to the first service connector socket and configured to receive a first connector plug of a first service connector plug of a service station; and the second connector socket is operatively associated to the second service connector socket and configured to receive a second connector plug of a second service connector plug of a service station.

In a 40th aspect according to any one of aspects 30 to 39, the machine further comprises a cleaning unit; and a suction unit; wherein the machine has at least a service mode in which the machine is configured to receive/discharge supplies from and to a service station and an operating mode in which the machine is configured to operate on stored supplies; the cleaning unit is connected to a feeding conduit; and the suction unit is connected to a suction conduit; and wherein, in the operating mode: the feeding conduit is configured to convey cleaning liquid from the first container to the cleaning unit; the cleaning unit is configured to act on a section of a floor surface using the cleaning liquid; the suction unit is configured to acquire cleaning liquid used by the cleaning unit from the floor surface and to convey the used cleaning liquid through the suction conduit and into the second container.

According to the invention, in a 41st aspect there is provided a system for servicing machines, comprising a service station according to any one of aspects 1 to 29 and one or more machines according to any one of aspects 30 to 40.

According to the invention, in a 42nd aspect there is provided a connection system for providing operating supplies to a machine to be serviced, the connection system comprising a first connector plug configured to connect to a corresponding first connector socket of a machine to be serviced; a second connector plug configured to connect to a corresponding second connector socket of the machine to be serviced; a first supply line connected to the first connector plug and configured to provide a charging current to the machine to be serviced; a second supply line connected to the second connector plug and configured to provide cleaning liquid to the machine to be serviced.

In a 43rd aspect according to the 42nd aspect, the connection system further comprises a service assembly having a first service connector plug, the first service connector plug being configured to connect to a first service connector socket of a machine to be serviced.

In a 44th aspect according to the 43rd aspect, the first service connector plug is configured to house the first connector plug and the second connector plug, optionally wherein the service assembly is configured to house the first supply line and the second supply line in a main supply conduit.

In a 45th aspect according to any one of aspects 42 or 43, the service assembly comprises a second service connector plug, the second service connector plug being configured to connect to a second service connector socket of a machine to be serviced.

In a 46th aspect according to the 45th aspect, the first service connector plug is configured to house the first connector plug and the second service connector plug is configured to house the second connector plug; and the first supply line and the second supply line are configured as separate first and second supply conduits, the first supply line being operatively associated to the first service connector plug and the second supply line being operatively associated to the second connector plug.

In a 47th aspect according to any one of aspects 43 to 46, the connection system further comprises a latching mechanism, the latching mechanism, when latched, being configured to prevent mechanical disconnection of the first service connector plug and the first service connector socket and being configured to, otherwise, enable mechanical disconnection of the first service connector plug and the first service connector socket and being configured to enable, the latching mechanism optionally including one of a rotary latch mechanism, a hook-and-eye mechanism, a buckle mechanism, or another suitable latch mechanism.

According to the invention, in a 48th aspect there is provided a method for servicing a machine to be serviced using a service station, the machine to be serviced comprising a first service connector socket; a machine control unit; a machine user interface connected to the machine control unit; a first container configured to receive cleaning liquid; a second container configured to receive used cleaning liquid, the second container being fluidly connected to a drain line configured to discharge used cleaning liquid from the second container, the drain line including a second drain flow controller configured to regulate flow of liquid through the drain line; the service station comprising a first service connector plug; a control unit; a first flow controller fluidly connected to a second inlet line and configured to supply cleaning liquid to the first service connector plug; the method comprising the steps of determining, at the control unit, that the first service connector plug is connected to the first service connector socket and disabling the machine user interface when a connection has been determined; receiving, at the control unit, a selected service process; performing, by the control unit, a series of service steps based on the selected service process; determining, at the control unit, whether all steps of the series of steps have been performed; preparing, by the control unit, the disconnection of the service connector plug and the service connector socket and enabling the machine user interface when a disconnection has been determined.

In a 49th aspect according to the 48th aspect, the step of determining that the first service connector plug is connected to the first service connector socket comprises locking, by the control unit, one of the first service connector plug and the first service connector socket to the other when a connection has been determined, and wherein the step of preparing the disconnection of the service connector plug and the service connector socket comprises releasing, by the control unit, the lock on the service connector plug and/or the service connector socket.

In a $50^{th}$ aspect according to the $49^{th}$ aspect, the step of connecting the first service connector plug to the first service connector socket further comprises mechanically locking one of the first service connector plug and the first service connector socket to the other.

In a $51^{st}$ aspect according to any one of aspects 48 to 50, the step of receiving the selected service process comprises providing, at a service station user interface, one or more service processes to be selected by a user; optionally further comprising selecting, by a user a service process to be performed based on the one or more service processes, based on one or more of user input; a type of the machine to be serviced; and a status of the machine to be serviced.

In a $52^{nd}$ aspect according to any one of aspects 48 to 51, the step of locking one of the first service connector plug and the first service connector socket to the other comprises controlling, by the control unit, a mechanical lock to engage the first service connector plug and the first service connector socket to one another, thereby preventing manual disconnection of the first service connector plug and the first service connector socket.

In a $53^{rd}$ aspect according to any one of aspects 48 to 52, the step of releasing the lock on the first service connector plug and/or the first service connector socket comprises controlling, by the control unit, a mechanical lock to disengage the first service connector plug and the first service connector socket from one another, thereby allowing manual disconnection of the first service connector plug and the first service connector socket.

In a $54^{th}$ aspect according to any one of aspects 48 to 53, the method further comprises, after the step of releasing the lock on the first service connector plug and/or the first service connector socket, the step of determining that the first service connector plug is disconnected from the first service connector socket and enabling the machine user interface when a disconnection has been determined.

In a $55^{th}$ aspect according to any one of aspects 48 to 54, the step of performing a series of service steps based on the selected process further comprises the steps of controlling, by the control unit, the machine control unit to control the second drain flow controller to allow used cleaning liquid to flow through the drain line; controlling, by the control unit, the second flow controller to cause delivery of cleaning liquid from the second inlet line to the second container; and/or controlling, by the control unit, the first flow controller to cause delivery of cleaning liquid to the first container.

In a $56^{th}$ aspect according to the $55^{th}$ aspect, the step of controlling the second drain flow controller to cause used cleaning liquid to flow through the drain line further comprises one of controlling the second drain flow controller to cause used cleaning liquid to flow through the drain line for a predetermined period of draining time, preferably the predetermined period of draining time being determined based on the type of the machine to be serviced; and detecting emptying of the second container based on a drain signal indicative of an amount of liquid present in the second container, the drain signal being provided by a sensor associated to the second container and configured to emit the drain signal.

In a $57^{th}$ aspect according to any one of aspects 48 to 56, the step of performing a series of service steps based on the selected process further comprises the steps of determining a charging profile based on the machine connected to the service station; determining a required charging current based on the charging profile; controlling, by the control unit, the charging unit to supply the charging current to the machine based on the required charging current.

In a $58^{th}$ aspect according to any one of aspects 48 to 57, the step of performing a series of service steps based on the selected process further comprises the steps of controlling the machine control unit to activate a blower configured to dry the first container and/or the second container.

In a $59^{th}$ aspect according to any one of aspects 48 to 58, the service station further comprises a first locking mechanism configured to selectively allow or prevent connection and disconnection of the first service connector plug, and a second service connector plug; and the machine to be serviced further comprises a second service connector socket. The method further comprises controlling the first locking mechanism to prevent disconnection of the first service connector plug when the second service connector plug is connected, and allow connection and disconnection of the first service connector plug when the second service connector plug is not connected.

In a $60^{th}$ aspect according to aspect 59, the service station further comprises a second locking mechanism configured to selectively allow or prevent connection and disconnection of the second service connector plug. The method further comprises controlling the second locking mechanism to prevent connection of the second service connector plug when the first service connector plug is not connected, and allow connection and disconnection of the second service connector plug when the first service connector plug is connected.

Advantages of the service station include that servicing can be performed in a highly automated manner, not requiring extensive user interaction, the latter typically including a user having to perform several steps that needed to be performed by the user manually, accurately and/or in a particular order, therefore being error prone and time consuming. In contrast, the service station can service a machine in a largely automated manner. The service station can detect the type of machine that is connected and automatically provide a selection of suitable service processes based on the type, usage history, age, and/or status of the machine. Further, a respective service process, for example including one or more of draining of liquids, rinsing and/or drying of tanks, cleaning of fluid lines, tanks, and nozzles, de-scaling of lines, tanks, and nozzles, re-filling of tanks, charging of batteries, etc., can be performed essentially without user interaction and/or automatically. The user is, thus, free to perform other tasks while the machine is being serviced.

Further the service station can be configured to monitor the service process and to abort or not even start the process in case of any service parameters not being met. For example, if corresponding supply connections are not correctly established, the service station can prevent the service process from starting. Similarly, during service, if any problems arise, the service process can be aborted, possibly in a controlled manner (e.g. preventing any liquids from spilling and/or preventing electrical hazards). The service station can further be configured to prevent incorrect user interaction, for example including selecting unsuitable service processes, attempting to charge a machine when no charging is recommended, attempting to move a machine during servicing, etc.

Moreover, the service station can be configured to provide suitable cleaning fluids and/or chemical compounds, in particular compositions thereof suitable for use with a respective machine and/or application. The service station can control the composition of the cleaning liquid, for example using a controlled dosing system that ensures the correct ratio of fluids or liquids being mixed. The service station can further ensure that liquid usage is minimized and that used liquids are disposed of properly. Depending on the selected process (e.g. de-scaling), particular compositions can be applied to a machine using a suitable process, potentially consisting of several cycles of filling tanks and lines, letting the chemical compounds work, and rinsing the tanks and lines again, in order to maximize the effect of the process and/or to minimize liquid usage.

Service stations can be configured to service several machines in parallel, thereby reducing servicing costs per machine significantly. Further, due to several machines being serviceable in parallel, a number of machines can be kept ready for operation at all times, thereby allowing a user to continuously operate one cleaning machine while another is being serviced and vice versa. This can optimize efficiency of operating personnel and reduce labor costs.

Advantages of the cleaning machine include that servicing the machine can be performed using the corresponding service connectors and sockets, thereby allowing the machine to be designed with the tank or tanks being sealed from direct user interaction, which substantially reduces or prevents contaminants, debris and/or unwanted substances to enter into the tank or tanks and/or to plug up or clog fluid lines, filters, valves, etc. Further, machines having combined tanks have a smaller footprint and require smaller housings, thereby leading to a reduction of production costs.

Further, the user interface of the machine can be disabled during servicing, thereby minimizing or preventing unintended and/or potentially dangerous user interaction (e.g. attempting to move the machine during servicing).

Operating a system of a service station and one or more cleaning machines can entail the advantage that service stations and/or machines can monitor and collect operational data indicative of a health status of a respective machine. Based on the health status of a machine, service processes can be adapted or selected (e.g. de-scaling at regular intervals, system or component checks at regular intervals). This can entail reduced down-time per machine and/or prolonged uninterrupted operating time per machine, due to developing problems (e.g. clogging of lines or valves due to buildup of limescale) not going undetected over longer periods of time.

Further advantages are described in more detail below.

BRIEF DESCRIPTION OF DRAWINGS

The present invention will become clearer by reading the following detailed description, given by way of example and not of limitation, to be read with reference to the accompanying drawings, wherein:

FIG. 3A shows a system including a service station and the cleaning machine shown in FIGS. 2C and 2D;

FIGS. 5A and 5B show an embodiment having two connection lines and corresponding two connector plugs;

FIG. 7 shows a flow chart illustrating a process for refilling a cleaning machine;

FIG. 8 shows a flow chart illustrating a maintenance process for a cleaning machine; and FIG. 9 shows a flow chart illustrating a process for servicing a cleaning machine.

DETAILED DESCRIPTION

Figure 1:
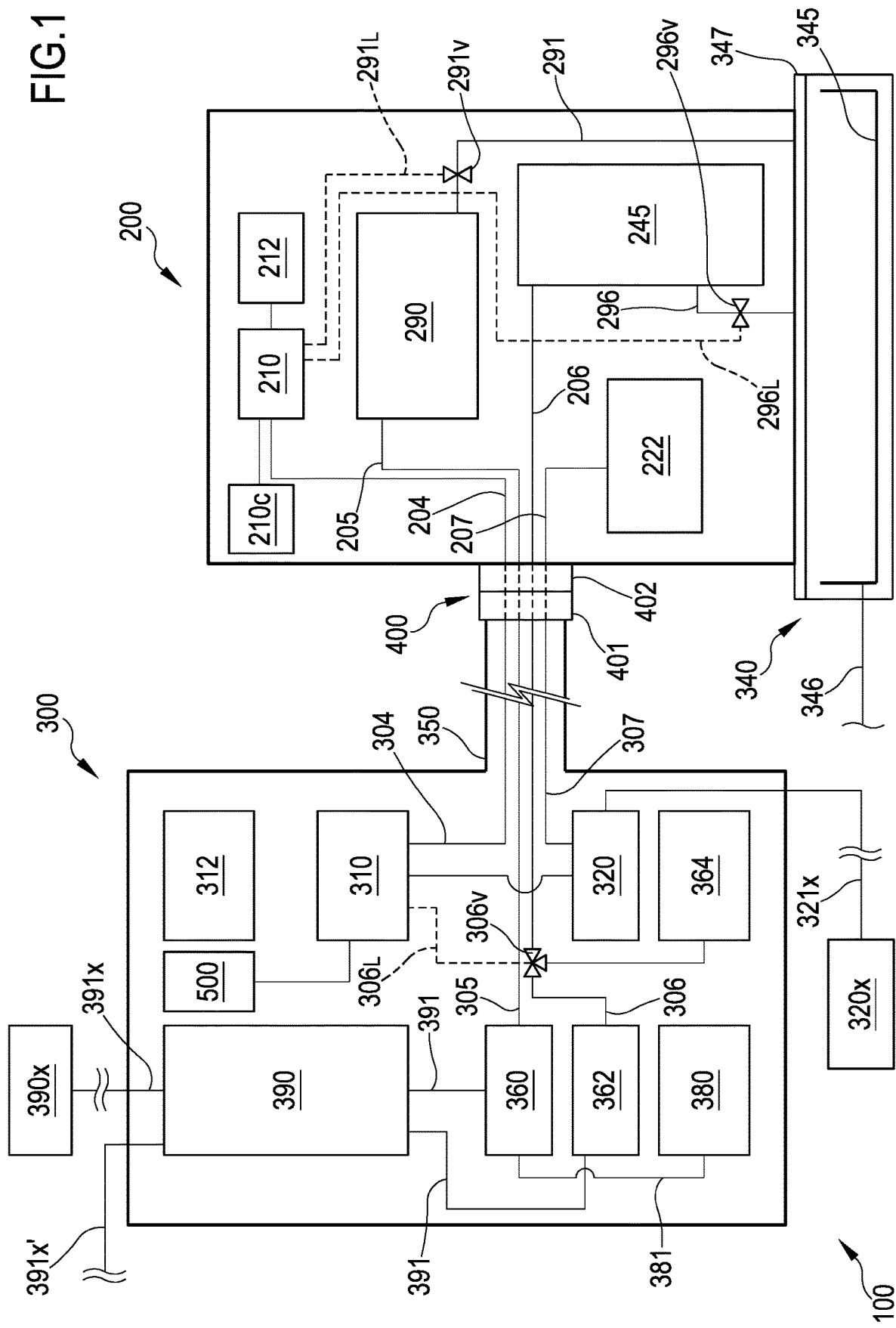
FIG. 1 shows a schematic overview of a system including a service station and a cleaning machine.

FIG. 1 shows a schematic overview of a system including a service station and a cleaning machine. Service station 300 is typically fixedly installed at a location suitable for service and maintenance of machines 200. A suitable location includes, for example, efficient access to supply and disposal lines (e.g. power outlets, water pipes, drain), sufficient space for different system components (e.g. tanks, trough), and/or a convenient location that can easily be reached by operators handling the respective machines. System 100 is shown including service station 300 connected to machine 200 via a main supply conduit (e.g. connection line) 350 and service assembly 400 (e.g. connector 400), the latter comprising connector plug 401 and connector socket 402. Further, machine 200 is placed in proximity to trough 340 in which receptacle 345 is arranged to convey liquids being released from machine 200 through corresponding outlet lines (e.g. lines 291, 296) towards and into a drain line 346. Trough 340, receptacle 345, and/or drain 346 can be equipped with a sieve or filter in order to keep debris from entering the drain line(s). In some embodiments a service station 300 has components connecting it to a single machine (e.g. one single connector plug 401, one single trough 340). In other embodiments, a service station can have multiple such components in order to facilitate servicing of more than one machine 300 at the same time. A service station can be provided with a number of different service lines and connectors in order to facilitate servicing of a number of different machines, each potentially provided with a different service connector socket. In some embodiments trough 340 is sized to optimally accommodate a machine of a particular type, for example in environments where only a single machine type is operated and/or when spatial limitations restrict the placement and operation of larger troughs. In other embodiments, one or more larger troughs can be employed, thereby allowing servicing of different machine types up to a maximum size that can be accommodated by the trough(s).

Service station 300 includes several components. Control unit 310 is connected to further components of service station 300 and configured to control these components. For clarity reasons, the respective connections between control unit 310 and other components controlled by it are not shown in FIG. 1. It is understood that control unit 310 can be connected to other components (e.g. pumps, valves) using connecting means known in the art. Control unit 310 is connected via lines 304 and 204 to machine control unit 210 of machine 200. In an alternative embodiment, control unit 310 can be directly connected to a charging unit (not shown), and—indirectly—via an additional control line to machine control unit 210 of machine 200. Control unit 310 may be connected to a communications device 500 configured to connect the service station 300 with a remote network 510 and/or to provide data communication to a machine 200 (e.g. via wireless communication unit 210c). The communications device 500 may be a wireless or cellular network adapter communicating on a suitable infrastructure such as 802.11x, TDMA, CDMA, or OFDMA.

Control unit 310 is further connected to a user interface 312. User interface 312 can include any input and/or output elements suitable for operating service station 300. In some embodiments, simple optical output components (e.g. LEDs, lights, LC displays) and input components (e.g. buttons, switches, selectors) can be employed, optionally in combination with other known components (e.g. audio output). In other embodiments more complex I/O components are employed (e.g. including a screen, touchscreen, keyboard, pointing device, trackball, pen, etc. and combinations thereof). The service station 300 shown in FIG. 1 includes a touchscreen 312 configured to display visual information for a user and to receive input from a user.

Service station 300 further includes fresh water container (or tank) 390 having outlet lines 391. In the embodiment shown in FIG. 1, tank 390 has one outlet line connecting it to flow controller 360, and another outlet line connecting it to flow controller 362. It is noted that flow controllers 360, 362 can include a valve or valves configured to regulate a flow of fluid through a line. For example, in embodiments where pressured liquid lines (e.g. water mains) are available, valves can be employed for regulating flow of liquid. In other embodiments, flow controllers 360, 362 can include a pump or pumps (e.g. positive displacement pumps) configured to generate a flow of fluid through a line. In the embodiment shown in FIG. 1, flow controllers 360, 362 are implemented as pumps. It is noted, however, that when elements 360, 362 are referred to below as pumps, this does not limit the general concept of flow controllers as described above. Further, tank 390 has an inlet line 391x and/or an inlet line 391x'. Line 391x' can be directly connected to a water pipe of a building and a valve (not shown) can be configured to selectively allow water to fill tank 390 as soon as the water within tank 390 falls below a minimum water level. Alternatively or in addition, as also shown in FIG. 1, tank 390 can further be connected to an external tank 390x via inlet line 391x. Tank 390x can be a comparatively large tank (e.g. containing 5 to 10 times the fresh water required to fill a machine 200) and in some embodiments, service station 300 does not have an internal tank 390, but only an external tank 390x. Tank 390x can be used as a buffer, so that a continuous water supply is provided to tank 390 (e.g. using an inlet line similar to inlet line 391x', directly connected to and supplying water to external tank 390x), independently from the actual water supply to tank 390x, which can fluctuate over time or be of too little capacity to efficiently fill tank 390 in a short period of time.

Pumps 360 and 362 are connected to tank 390 (if present) or tank 390x and are configured to supply fresh water to machine 200 via respective outlet lines 305 and 306. Pump 360 is configured to supply fresh water to machine 200 via line 305 and is additionally configured to supply a chemical component from tank 380 to machine 200. Typically, the chemical component (e.g. detergent, cleaning agent) is added to the fresh water during the supply of fresh water to machine 200. The adding of chemical components is typically performed using separate dosing mechanisms (not shown), for example separately controlled dosing pumps, Venturi system, or other systems known in the art. In some embodiments, the chemical component is added before or after the supply of fresh water to machine 200. Pump 360 is connected to control unit 310 in order to control the respective pump rate. The rate of chemical component being introduced into the fresh water supply is controlled separately based on the dosing system employed.

Instead of pump 360 being connected to tank 380, an automated dispenser system (not shown) can be integrated into line 305. The automated dispenser system can be configured to add a predetermined amount of chemical component to the fresh water passing through line 305, such that a predetermined mixing ratio of chemical component with respect to fresh water is achieved merely by flow of fresh water through the dispenser. This particular arrangement ensures a proper mixing ratio once the dispenser is set accordingly, without requiring further (manual) intervention.

Similar to pump 360, pump 362 is configured to supply fresh water to machine 200. However, pump 362 is configured to supply fresh water with a comparatively high pressure for rinsing and cleaning purposes. As can be seen in FIG. 1, pump 360 is connected via lines 305, 205 to solution tank 290 containing fresh solution for cleaning. Pump 362 is connected via lines 306, 206 to used solution tank 245 configured to collected used cleaning solution. In order to properly rinse and/or clean tank 245, pump 362 is configured to supply fresh water at a comparatively high pressure. The high-pressure water supply serves to rinse dirt and/or other debris, sediments, scaling, etc. from tank 245. The rinsing water containing such dirt or debris can then be drained through line 296 and into receptacle 345 of trough 340. Pump 362 can be connected to a tank containing a rinsing and/or cleaning agent or other chemical component supporting treatment of tank 245. Pump 362 can also be operated in connection with a dispenser arranged in line 306 as described above with respect to pump 360 and line 305.

Service station 300 can further include a blower 364 configured to generate a stream of hot or cold air. Blower 364 is also connected to line 306 using a suitable branch mechanism (e.g. a switching valve configured to selectively connect one of two lines with a third line) so that, when blower 364 is put in fluid communication with lines 306 and 206, a supply of hot and/or cold air from blower 364 can be provided through the lines in order to dry components (e.g. lines, tanks) of a machine to be serviced. This is particularly useful if the machine is scheduled for decommissioning (i.e. not being used for an extended period of time, e.g. several days, weeks or longer).

Service station 300 further includes a combined power/charging unit 320. In some embodiments, the power unit can be a stand-alone unit separate from the charging unit 320. The power unit is connected to a corresponding power source 320x (e.g. a power outlet in a building) via an electrical inlet line 321x and configured to supply different components (e.g. control unit 310, charging unit 320, pumps 360, 362, etc.) with electrical energy. The power unit is, to this aim, connected to the respective components (individual connections not shown in FIG. 1 for clarity). Charging unit 320 is either connected to the power unit or an integral component thereof in order to be supplied with charging energy. Further, charging unit 320 is connected to control unit 310 in order to receive control signals from control unit 310. Charging unit 320 is further connected via lines 307 and 207 to battery 222 of machine 200.

Service station 300 can further include a trough 340 having a receptacle 345 and drain line 346. In some embodiments, trough 340 is integrated into the floor in form of a grid and/or drain integrated into the floor. In other embodiments and as shown in FIG. 1, trough 340 is implemented as a platform onto which machine 200 can be placed. The platform can include a grid 347, which allows the draining of liquids from machine 200 into receptacle 345. Generally, service station 300 can be implemented as an "all-in-one" system having all components arranged within a single compartment or housing. In some embodiments, individual components can be implemented externally to a main housing, for example when fluid tanks are placed at a distance to the main housing of the service station (e.g. due to space restrictions). Further, several service stations can share one (external) component, for example a large fresh water tank serving several service stations. Moreover, in some embodiments, the service station may be connected to a communications network for one or two-way communications with remote instruction and/or data sources (e.g., a remote computer).

Cleaning machine 200 includes a connector socket 402 configured to connect to connector plug 401 of service assembly 400. It is noted that other configurations are possible here, for example an embodiment in which machine 200 includes a connection line similar to main supply conduit 350 of service station 300, and in which machine 200 includes a connector plug corresponding to a connector socket arranged on service station 300. In still other embodiments, both service station 300 and machine 200 can include connection lines similar to main supply conduit 350, and where both service station 300 and machine 200 include matching connector plugs (e.g. in an embodiment in which no fixed socket is present, but in which connector plugs are connected to one another). In other embodiments, separate service connection lines and connectors/sockets can be provided based on the conduits included therein. In one exemplary embodiment, a separate service line and corresponding service connector are provided for establishing fluid connections (e.g. supply of cleaning solution and/or rinsing liquid). Another separate service line and corresponding service connector are provided for establishing electrical connections (e.g. data transfer, supply of charging energy). Irrespective of the individual embodiment of connection line, plug, and/or socket, the functioning of the connection is substantially similar to what is described with respect to the embodiment shown in FIG. 1.

Machine control unit 210 is connected to multiple components of machine 200 (e.g. containers/tanks, valves, charging unit, and other; not all connections are shown for clarity). One key requirement of system 100 is that manual interaction with machine control unit 210, for example using the machine control panel, be interrupted during any service or maintenance process, so that control of machine components and/or functions can be performed by the service station 300 (e.g. by service station control unit 310). Thus, one function that is implemented in all embodiments is the deactivation of the machine control panel during service or maintenance, or as long as any service connector or connectors are connected to machine 200. This can be achieved, for example, as shown in FIG. 1 by a connection between control unit 310 and machine control unit 210. Once charging unit 320 is configured, for example based on a charging profile, to supply a corresponding charging current to batteries 222 (e.g. through lines 307 and 207), machine control unit 210 disables control panel 212. It is noted that, apart from what is shown in FIG. 1 (see line between machine control unit 210 and charging unit 320), other mechanisms can be applied, in order to achieve disabling of control panel 212 (or deactivation of the entire machine control unit 210). For example, the disabling can be triggered by connection and/or latching of connector plug 401 and connector socket 402, typically performed by an operator when connecting machine 200 to service station 300. Similarly, the disabling can be triggered by locking of connector plug 401 and connector socket 402, typically performed by service station 300 (i.e. by control unit 310) before commencement of service and maintenance. It is understood that other mechanisms can be employed to ensure the deactivation of control panel 212 and/or control unit 210 as soon as connector plug 401 is connected to connector socket 402.

Machine control unit 210 is further connected to a user interface 212. User interface 212 can include any input and/or output elements suitable for operating machine 200. In some embodiments, for example shown in FIG. 1, optical output components (e.g. LEDs, lights, LC displays) and input components (e.g. buttons, switches, selectors) can be employed. In other embodiments more complex I/O components are employed (e.g. including a screen or touchscreen, keys or a keyboard, key-operated switches, etc. and combinations thereof). Machine 200 shown in FIG. 1 includes one or more lamps or lights, gauges, switches, levers, etc. to output information, and to receive input from a user. It is understood that machine 200 can further comprises controls for operating the machine (e.g. a steering wheel and pedals for ride-on machines and a steering handle for walk-behind machines). Machine control unit 210 may be connected to a wireless communication unit 210c configured to emit and/or receive control signals via a wireless data connection. The wireless communication unit 201c may be a wireless or cellular network adapter communicating on a suitable infrastructure such as 802.11x, TDMA, CDMA, or OFDMA.

Machine control unit 210 not only controls the regular operation of machine 200, for example when a user operates machine 200 during regular cleaning operation. Machine control unit 210 is also configured to control operation of different components of machine 200 during service and maintenance. For example, upon connection of main supply conduit 350, machine control unit disables control panel 212 and upon removal of the connection, re-enables control panel 212. During service and maintenance, machine control unit 210 further controls drain valves 291v and 296v in order to facilitate draining and rinsing of tanks 290 and 245 (see below). Corresponding control lines 2911 and 2961 are shown as dashed lines in FIG. 1.

Machine 200 further includes a fresh solution container (or tank) 290 configured to store fresh cleaning solution provided by service station 300 using pump 360 and lines 305, 205. It is noted that in some embodiments, fresh cleaning solution can alternatively be provided directly from a water line or from container 390 without the use of a pump. Fresh solution tank 290 has a drain line 291 and a drain valve 291v. Drain line 291 is configured to convey liquid present in fresh solution tank 290 into trough 340. It is noted that drain valve 291v can be directly controlled by machine control unit 210 or, indirectly, by service station control unit 310 via machine control unit 210, while machine 200 is connected to service station 300.

Machine 200 further includes a used solution tank 245 configured to collect used cleaning solution acquired by means of a suction unit and/or squeegee assembly (not shown). Used cleaning solution is collected during regular cleaning operation of machine 200. Whenever used cleaning solution tank approaches its maximum capacity, machine 200 needs to undergo a service process in which used cleaning solution is drained from used cleaning solution tank 245. To this aim, and similar to fresh solution tank 290 as described above, used cleaning solution tank 245 has a drain line 296 and a drain valve 296*v* configured to conduct liquid present in used cleaning solution tank 245 into trough 340. It is noted that drain valve 296*v*, like valve 291*v*, can be directly controlled by machine control unit 210 or, indirectly, by service station control unit 310 via machine control unit 210, while machine 200 is connected to service station 300. It is noted that tanks (e.g. tanks 290 or 245) are implemented in a closed configuration where the tanks are generally inaccessible so that no unwanted substances and/or debris can get into the respective tank during refill or operation. However, in embodiments where machines are designed to allow manual operation as well as service conducted using a service station, the respective tanks can be implemented in a configuration where manual opening of the tank or tanks is possible (e.g. for refilling, inspection, or cleaning). Also, machines may be equipped with a secondary charging mechanism (e.g. a respective compartment that can be manually opened and which houses a common power cable and plug for standard power outlets). Embodiments having a secondary charging mechanism allow for charging of the machine in cases where the remaining charge is too low in order to reach the nearest service station.

Machine 200 further includes a battery 222. In the embodiment shown in FIG. 1, battery 222 is directly connected to connector socket 402 via line 207 and further to charging unit 320 via line 307. Depending upon the battery technology used (e.g. Li-Ion, Lead-Acid, or other suitable battery technologies), charging unit 320 can be individually configured in order to operate based on the correct charging profile and/or to implement different charging methods. Typically, charging unit 320 stores charging profiles for different battery types. Upon detection of the type of machine 200 connected to service station 300 (including detection or determination of the respective battery type), control unit 310 determines the correct profile to use in connection with machine 200 and, thus, the correct charging profile (and current) to use for battery 222. Charging unit 320 provides, based on a charging profile, battery 222 with a charging current in line with the battery's requirements. Upon completion of charging, the charging current is interrupted.

Figure 2A:
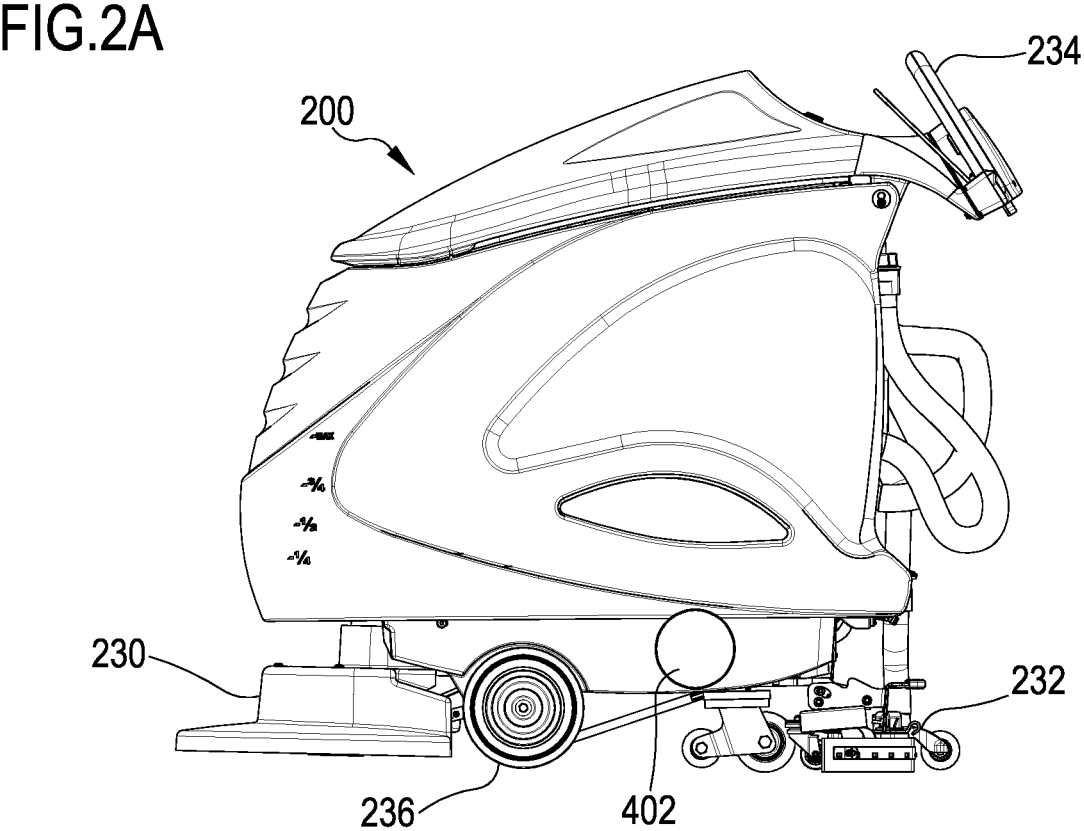
FIGS. 2A and 2B show a first embodiment of a cleaning machine.
Figure 2B:
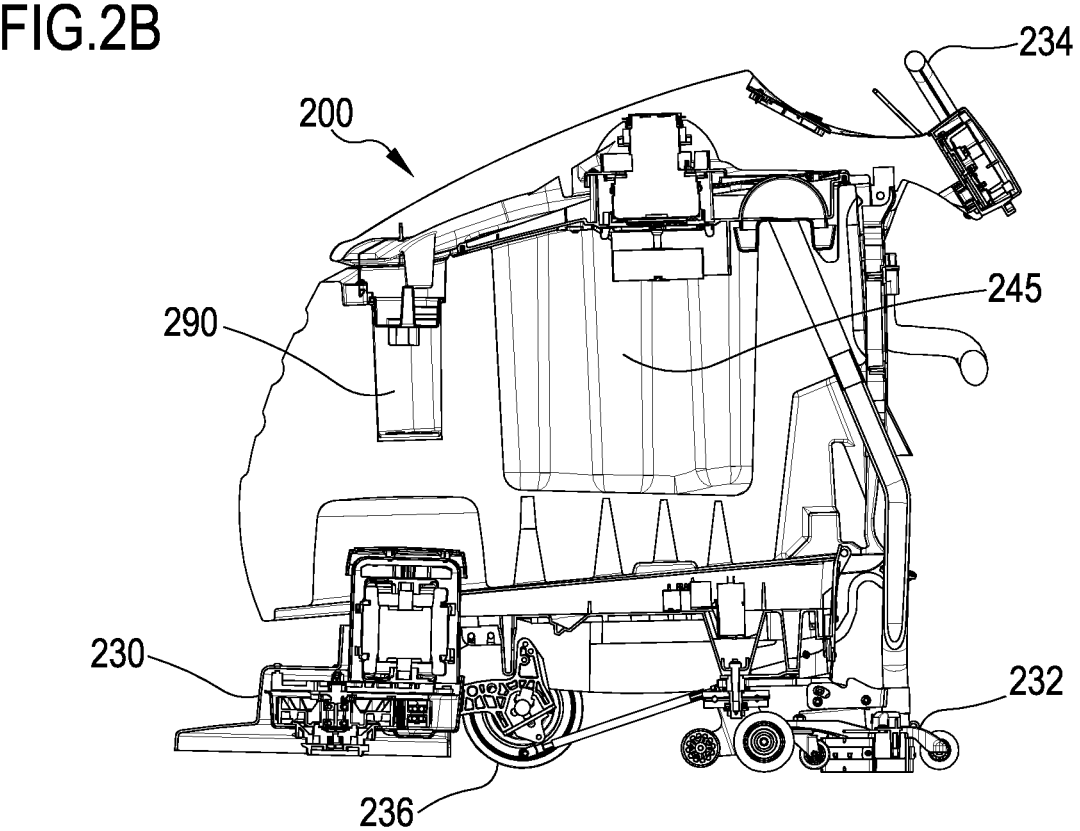

FIGS. 2A and 2B show a first embodiment of a cleaning machine. In the first embodiment, machine 200 is implemented as a walk-behind scrubber drier having a cleaning unit 230, a suction unit/squeegee 232, a drive unit 236, and a handle 234. The operator walks behind machine 200 at approximately walking speed (e.g. 5 km/h) and directs machine 200 across the surfaces to be cleaned by using handle 234. Connector socket 402 can be arranged as shown in FIG. 2A, namely on the left side of machine 200 based on an operational moving direction. FIG. 2B shows further components of machine 200, for example tanks 290 and 245.

Figure 2C:
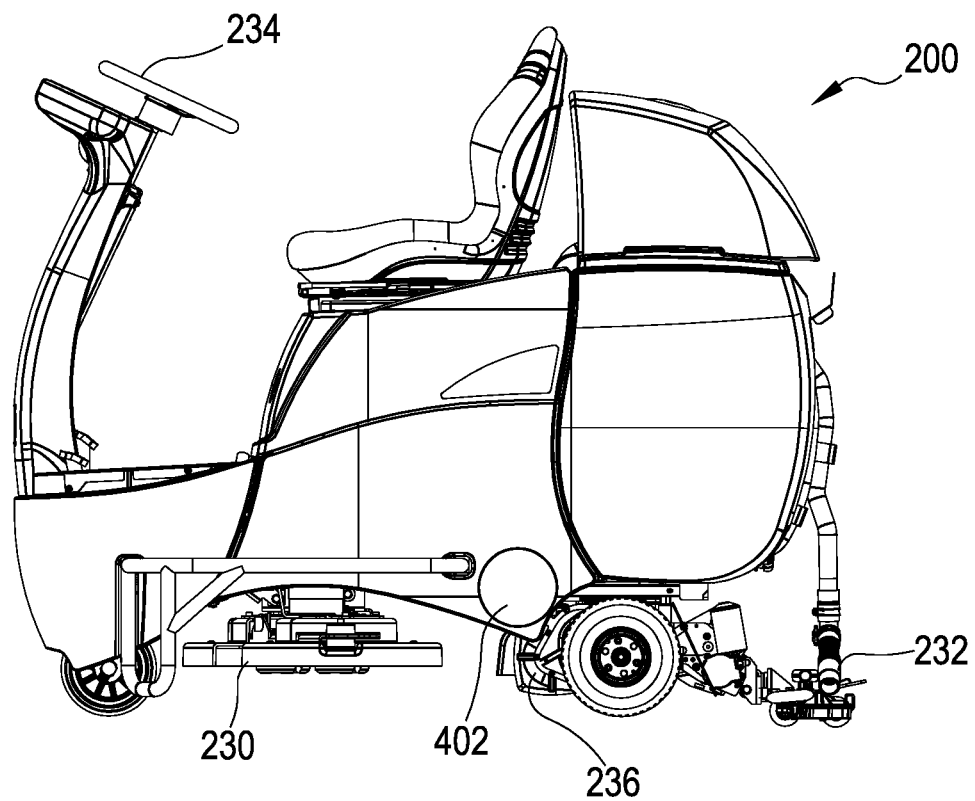
FIGS. 2C and 2D show a second embodiment of a cleaning machine.
Figure 2D:
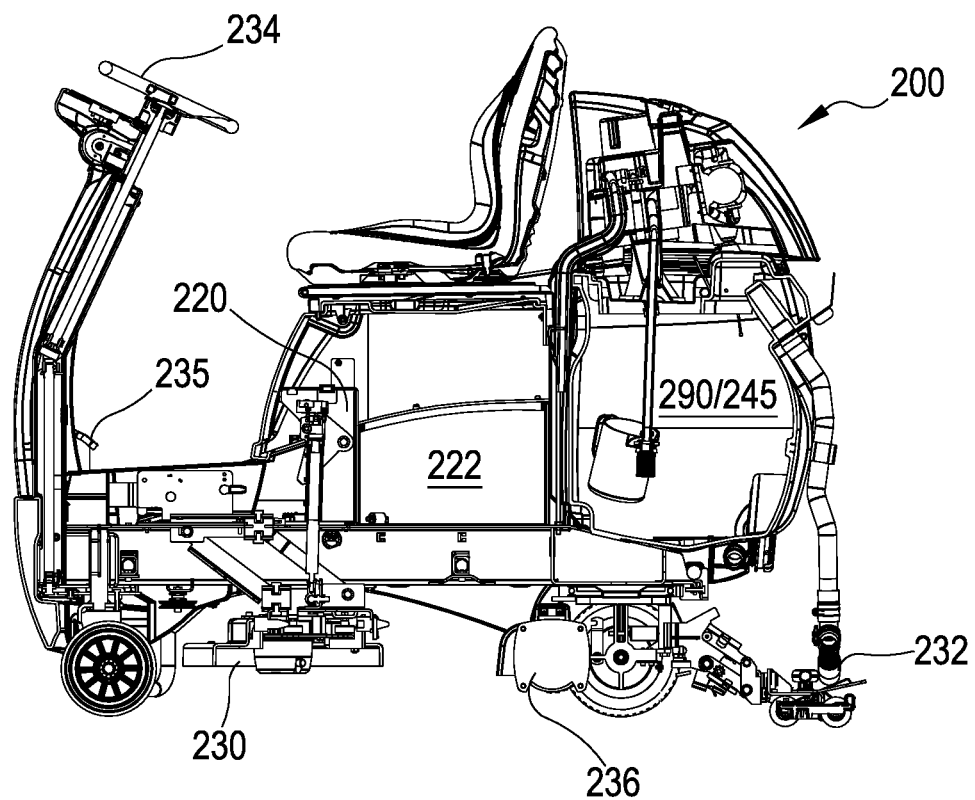

FIGS. 2C and 2D show a second embodiment of a cleaning machine. In the second embodiment, machine 200 is implemented as a ride-on scrubber drier having a cleaning unit 230, a suction unit/squeegee 232, a drive unit 236, a steering wheel 234, and pedals 235. The operator sits on machine 200, which can move at slightly above walking speed (e.g. approximately 7 km/h), and directs machine 200 across the surfaces to be cleaned by using steering wheel 234 and pedals 235. Connector socket 402 can be arranged as shown in FIG. 2C, namely on the left side of machine 200 based on an operational moving direction. FIG. 2D shows further components of machine 200, for example tanks 290 and 245, battery 222. In some embodiments, when charging needs to be performed without a service station 300, machine 200 can further include an onboard charging unit 220.

In the second embodiment, tanks 290 and 245 are implemented in a combined tank using a flexible side wall. This concept can be used with many different types of machines and is based on a flexible tank that adapts to its respective used capacity. In one example, fresh solution tank 290 is made from a flexible material that allows for deformation of the walls of the tank. At the start of operation, tank 290 is substantially full of fresh cleaning solution and tank 245, which is shaped to correspond to the dimensions of tank 290 if fully occupied and which is made from a rigid material, is substantially empty. As cleaning solution is removed from tank 290, used during cleaning, and collected again by suction unit/squeegee 232, it is collected as used cleaning solution in tank 245. In this manner, space previously occupied in tank 290 by fresh cleaning solution is made available by corresponding shifting of the flexible walls of tank 290. Thus, space is made available for used cleaning solution in tank 245.

It is noted that the particular implementation of tanks 290 and 245 as separate rigid tanks or combined tanks does not impact the general operation of machine 200. In some details, however, both separate and combined tanks have inherent advantages and disadvantages. Combined tanks, for example, typically save a substantial amount of space and allow for bigger capacities than separate rigid tanks in a vehicle of the same size. On the other hand, separate rigid tanks can be drained and filled at substantially the same time, because their capacity and/or cleaning is independent from the other.

It is noted that other implementations of machines exist, for example ranging from very small walk-behind machines of the size of a vacuum cleaner, to larger walk-behind machines having sizable tanks, to ride-on machines which allow for efficient and effective cleaning of large spaces. Service station 300 and the processes associated therewith are substantially independent from the particular type of machine used, provided that similar service processes are performed (e.g. draining/filling of liquids, charging, etc.). In general, the machines 200 can further include a cleaning unit and a suction unit. A machine 200 typically has at least a service mode in which the machine is configured to receive/discharge supplies from and to a service station 300 and an operating mode in which the machine is configured to operate on stored supplies. The cleaning unit is connected to a feeding conduit and the suction unit is connected to a suction conduit. In the operating mode the feeding conduit is configured to convey cleaning liquid from tank 290 to the cleaning unit. Further, the cleaning unit is configured to act on a section of a floor surface using the cleaning liquid. The suction unit is configured to acquire cleaning liquid used by the cleaning unit from the floor surface and to convey the used cleaning liquid through the suction conduit and into the tank 245.

FIG. 3A shows a system including a service station and the cleaning machine shown in FIGS. 2A and 2B. Machine 200 is of a ride-on type and is shown in a service arrangement, positioned on a trough 340 and ready for connection to service station 300 via service assembly 400. Machine 200 is placed on grid 347 of trough 340, which allows for disposal of used cleaning solution and rinsing/cleaning liquids. Service station 300 is shown having an external tank 390x connected to service station 300 via line 391x. Further, machine 200 can be connected to service station 300 via main supply conduit 350. FIG. 3A shows an example configuration using a single service line. In other examples, machine 200 can be connected to service station 300 using more than one service line (see above). As indicated above, service station may be connected to a wired or wireless communications network for one or two-way communications with remote instruction and/or data sources. Such communications may permit remote collection of machine data, such as operating hours, battery capacity, fluid volumes used/dispensed, or other operating data. The communications network might also permit remote programming or updating of the service station 300 and/or machine 200. FIG. 3A illustrates one embodiment of a wireless communications device 500 adapted to connect the service station 300 with a remote network 510. The communications device 500 may be a wireless or cellular network adapter communicating on a suitable infrastructure such as 802.11x, TDMA, CDMA, or OFDMA.

Figure 3B:
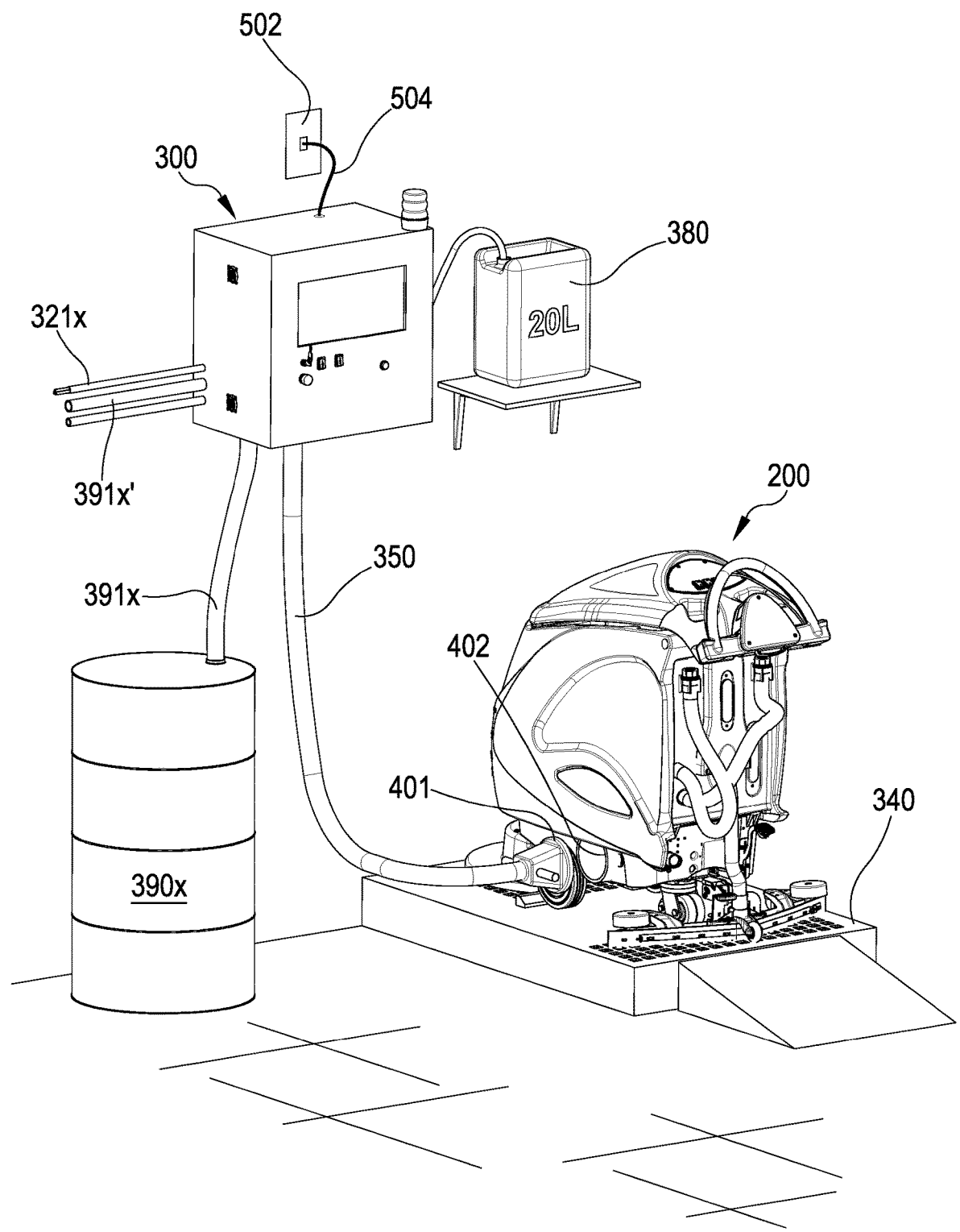
FIG. 3B shows a system including a service station and the cleaning machine shown in FIGS. 2A and 2B.

FIG. 3B shows a system including a service station and the cleaning machine shown in FIGS. 2C and 2D. Machine 200 is of a walk-behind type and is shown in a service arrangement, positioned on a trough 340 and ready for connection to a wall-mounted service station 300 via service assembly 400. Machine 200 is placed on grid 347, which allows for disposal of used cleaning solution and rinsing/cleaning liquids.

Service station 300 is shown having an external tank 390x connected to service station 300 via line 391x. Further, machine 200 can be connected to service station 300 via main supply conduit 350. In addition, service station 300 may be connected via a wired, physical connection 504 to a communications port 502 for communications via a network to remote computing systems. In one embodiment, the physical connection 504 may include an Ethernet cable and the communications port 502 may include an RJ45 connection as is known in the art for communicating over a TCP/IP network infrastructure.

Both with respect to FIGS. 3A and 3B, it is noted that external tanks 390x are optional and can be replaced by corresponding connections to building water pipes. However, for reasons of efficiency, such water pipes should be of sufficient dimensions in order to allow quick filling of machine tanks (e.g. tank 290).

Figure 4:
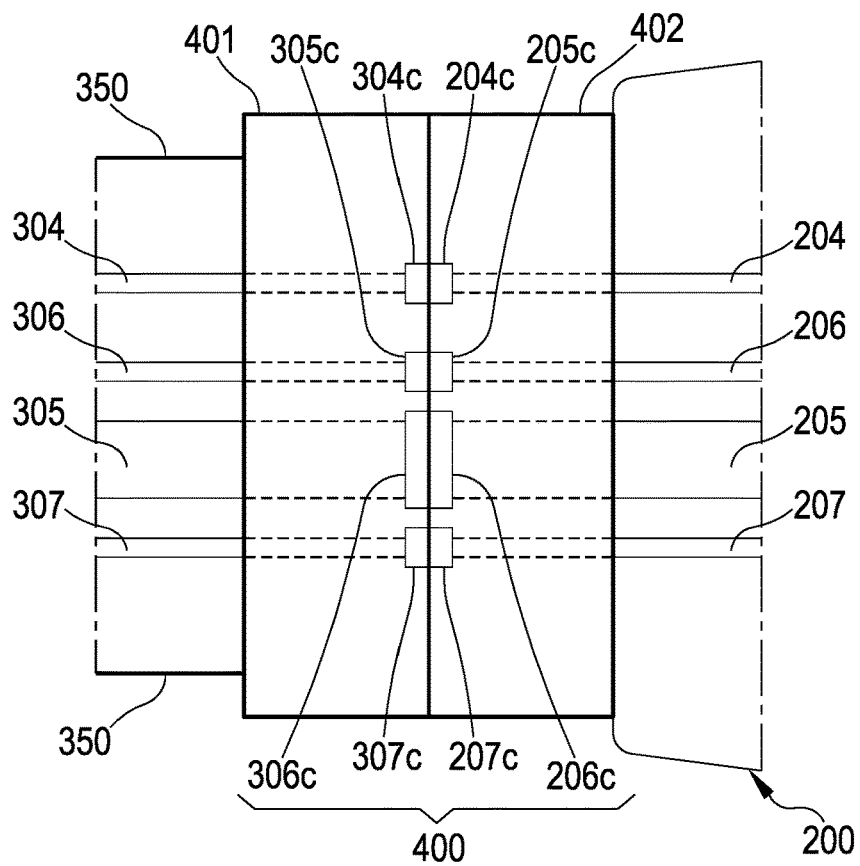
FIG. 4 shows a schematic overview of a connector plug and socket configured to connect a service station and a cleaning machine.

FIG. 4 shows a schematic overview of a connector plug and socket configured to connect a service station and a cleaning machine. In general, service assembly 400 comprises a connector plug 401 and a connector socket 402. Service assembly 400 is configured to provide electrical and fluid connection in one single connector. FIG. 4 shows an example configuration based on the use of a single service line and a single connector. In other examples, the connection between a service station 300 and a machine 200 can be established using more than one service line and connector plug/socket (see above).

Line 304 is an electrical line, which is connected via connectors 304c and 204c to line 204. Line 304 can consist of one or several electrical leads (e.g. Vcc, Data−, Data+, and GND of a USB connection, or V+, CAN-low, CAN-high, and GND of a CAN bus connection) depending upon the electrical connection used. Line 304 is configured to provide data communication between control unit 310 and data exchange device (if present) and machine control unit 210. Data communication can be provided using any known wired or wireless communication standard (e.g. Bluetooth, WiFi, USB, CAN bus, RS-232, etc.). It is noted that wired and wireless communications can be employed in a single embodiment, for example when initiating wireless communications via a wired connection, in order to ensure that the correct components communicate with one another. Data communication via lines 304, 204 can be used for initiating a wireless communication or for bulk data transfer.

Lines 305 and 306 are fluid lines, respectively connected via connectors 305c/205c and 306c/206c to lines 205 and 306. Lines 305/205 and 306/206 are configured to supply liquids to machine 200. Line 305/205 is shown as having a larger diameter than line 306/206 due to the different purpose. While line 305/205 is configured to provide a high volume of fresh cleaning solution to tank 290, line 306/206 is configured to provide a high pressure rinsing/cleaning solution to tank 245. Due to the different requirements, lines 305/205 and 306/206, as well as corresponding connectors 305c/205c and 306c/206c can be implemented differently. Line 305 and/or 306 can respectively include a supply fluid flow controller (e.g. an occlusive pump or a valve; not shown) configured to selectively prevent fluid flow through the respective line. In some embodiments, the supply fluid flow controller can be integrated into the respective connector 305c and/or 306c (e.g. a control valve integrated into the connector, the valve optionally preventing the fluid flow whenever the connector is not connected to a corresponding socket). Similarly, line 205 and/or 206 can respectively include a service fluid flow controller (e.g. an occlusive pump or a valve; not shown) configured to selectively prevent fluid flow through the respective line. In some embodiments, the supply fluid flow controller can be integrated into the respective socket 205c and/or 206c (e.g. a control valve integrated into the socket, the valve optionally preventing the fluid flow whenever the socket is not connected to a corresponding connector). In some embodiments, fluid flow is prevented by respective fluid flow controllers, thereby preventing any likelihood that (residual) fluid flows from any of the connectors and/or sockets when no connection is established.

Lines 307/207 are electrical lines configured to provide a charging current to batteries 222, based on a corresponding charging profile. Connectors 307c and 207c can be implemented using any suitable connector known in the art (e.g. high power connectors or similar) as long as a maximum charging current can be sustained. Further requirements can apply, for example that fluid lines are connected only when a proper connection between electrical lines has been ensured. Similarly, the electrical connections might be established only after proper, leak-proof connections of the fluid lines are ensured.

Service assembly 400 is further designed to allow for several safety functions. For example, an operator should not be able to incorrectly connect connector plug 401 and connector socket 402. This can be achieved, for example, using a latch-type mechanism, which prevents maintaining an incorrect connection. In one example, connector plug 401 must be placed in correspondence of connector socket 402 and, subsequently, a rotatory latching movement must be exerted upon connector plug 401. If this latching movement is not completed or missed, then connector plug 401 mechanically separates from connector socket 402 upon release by the operator. Only upon correct latching of connector plug 401, the connection is maintained when connector plug 401 is let go by the operator. In another example, the connector plug 401 and connector socket 402 may include keying features for proper orientation and mating of the plug 401 and socket 402.

Another safety function exists in mechanical locking of service assembly 400 by control unit 310 (or in another manner operated by service station 300 or machine 200). This prevents any likelihood that the connection is removed during ongoing service or maintenance either unintentionally or by mistake. Control unit 310 is configured to start a service or maintenance process only when service assembly 400 is latched and locked. Likewise, unlocking or unlatching of service assembly 400 prior to the process having finished, or prior to having been aborted at control unit 310, is prevented. A locking mechanism can include any known locking means, for example mechanical, magnetic, or other. Preferably, the locking mechanism is controlled by control unit 310 via an actuator that selectively locks and unlocks the corresponding connector, based on control signals received from control unit 310. Suitable actuators may be configured to prevent an unlocking movement of a connector with respect to a corresponding socket, for example a rotatory movement, a sliding movement, or a shifting movement. These and similar movements can be prevented by an actuator moving a pin into a corresponding slot and enabled by the actuator retracting the pin from the slot. In some embodiments, the service assembly 400 includes a pin and sleeve connector in which the sleeve can be coupled and fastened to a corresponding structure (e.g. a tread) of a corresponding socket in a rotatory manner. Uncoupling can, in these embodiments, be prevented by keeping the sleeve from rotating using, for example, a pin and slot. If the service assembly comprises two or more separate connection lines having separate connector/socket pairs, each connector/socket pair can include a separate locking mechanism. For clarity, the schematic illustration of FIG. 4 does not show a locking mechanism.

Figure 5:
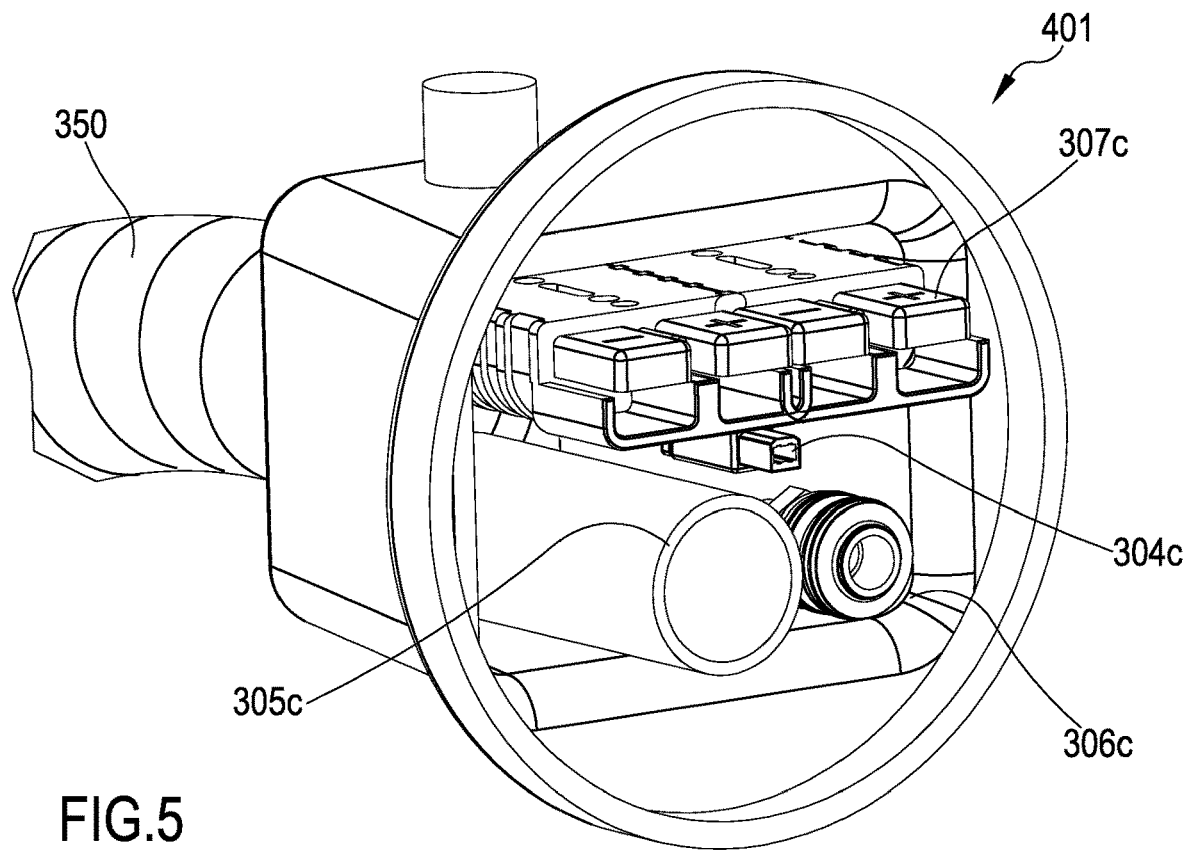
FIG. 5 shows an embodiment of a connector plug corresponding to what is shown in FIG. 4.

FIG. 5 shows an embodiment of a connector plug corresponding to what is shown in FIG. 4. Connector plug 401 shows different connectors 304c, 305c, 306c, and 307c. In the embodiment shown, connector 304c is implemented as a USB connector. Connector 304c can alternatively be implemented based on any known wired or wireless communication standard known in the art (e.g. CAN bus, Bluetooth, WiFi, etc.). If wireless standards are used, connector 304c can be implemented merely for initiation of communications (e.g. an encrypted ad-hoc WiFi connection being established based on data exchanged via USB or the mere establishment of an electrical connection at connector 304c) or not be implemented at all. Connectors 305c and 306c can be implemented as standard connectors for water lines and be configured to fulfill the necessary requirements with respect to pressure, throughput, etc. In some embodiments, connectors 305c and 306c are designed to connect only after connection between connectors 304c/204c and 307c/207c has been established. Connector 307c can be implemented as any known high power connector plug. It is noted that connector 307c can alternatively be implemented based on any known wired or wireless power transfer standard known in the art. In some examples, charging can be effected via induction coils, in which case connector 307c can be implemented as a data communication (e.g. in order to establish communication for charging purposes) or not be implemented at all.

Figure 5A:
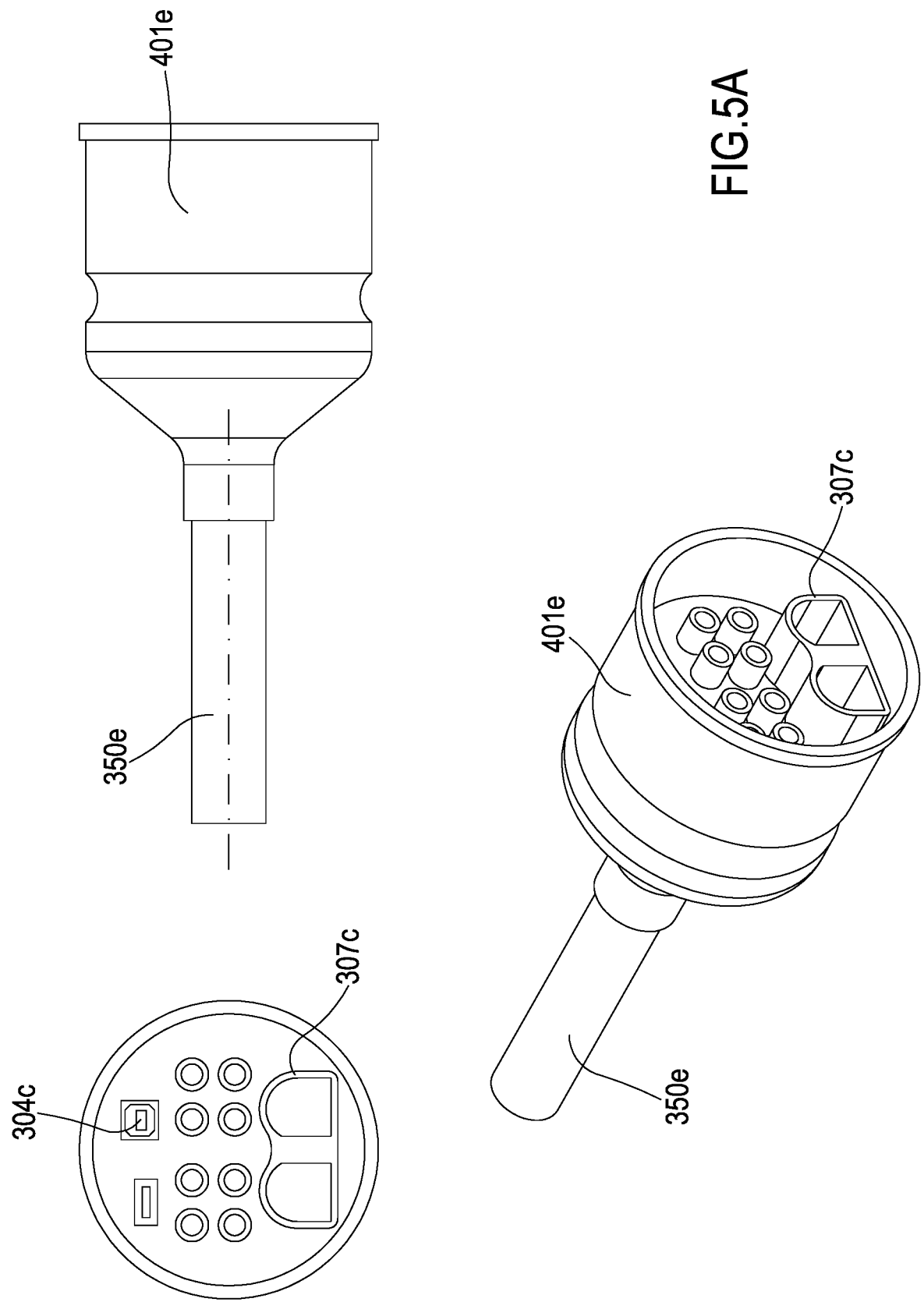

FIGS. 5A and 5B show an embodiment where electrical and liquid/fluid connections are separated into two connection lines and corresponding two connector plugs. Generally, the functionalities of connectors 401e and 401f and lines 350e and 350f as shown in FIGS. 5A and 5B essentially correspond to those of connector 401 as shown in FIGS. 4 and 5. In this embodiment, and as shown in FIG. 5A, line 350e combines electrical lines and includes lines 304 and 307. Further, connector 401e includes connectors 304c and 307c in order to provide an electrical connection between service station 300 and machine 200. Correspondingly, and as shown in FIG. 5B, line 350f combines liquid and/or fluid lines and includes lines 305 and 306. Connector 401f includes connectors 305c and 306c in order to provide a liquid and/or fluid connection between service station 300 and machine 200. It is understood that the individual implementation of lines 350, 350e, and 350f in combination with corresponding connectors 401, 401e, and 401f, is of secondary importance. The connection between service station 300 and machine 200 can be established using a single line 350 and connector 401, using two separate lines 350e and 350f as well as connectors 401e and 401f, or any other combination of electrical and/or fluid lines as required by the respective application. In some embodiments each connection line 304, 305, 306, and/or 307, can have a single separate corresponding connector 304c, 305c, 306c, and/or 307c. It is understood that any combination of connectors and lines can be employed in order to connect service station 300 and machine 200. Combining one or more of lines 304, 305, 306, and/or 307 into a main supply conduit 350, 350e, 350f, can entail the advantage that similar lines (e.g. electrical, fluid/liquid) can be combined and, thus, be handled according to the individual purpose. Further, having multiple connectors, for example 401e and 401f, facilitates establishing connections in a specific order by simply connecting corresponding connectors in a predefined sequence.

With respect to the interaction between service station 300 and a machine to be serviced 200, general safety precautions apply and are controlled by service station 300. Additionally, mechanical elements can be built into all connectors and connection components. Further, control unit 310 of service station 300 controls activation of service functions. One key criteria during service of any kind is that the machine must remain stationary and connected during the entire service. A connection between a machine 200 and a service station 300 can only be established when the latter is powered and operational. In some embodiments, a mechanical lock or multiple locks controlled by control unit 310 can prevent connection of a machine 200 when service station 300 is not operational. The lock or locks can be configured to automatically (e.g. by a mechanical mechanism such as a spring) unlock upon shutdown of service station 300 or when power is removed therefrom in order to facilitate disconnection of the connected machine 200. In all embodiments, any drive functions of the machine 200 are deactivated upon (electrical, fluid, and/or mechanical) connection of the machine 200 to a service station 300. Control unit 310 is configured to prevent selection and/or execution of a service process (e.g. a service program executed by control unit 310) as long as there is no latched and/or locked connection to a machine 200. If operator interaction is required (e.g. physically connecting one or more service plugs and service sockets), the required steps can be displayed on an output unit (e.g. display, touchscreen). Upon connection of a machine 200, an operator can select one of several service processes (e.g. refilling, service, maintenance; see below). Before or upon selection of a process, control unit 310 either checks that the connection or connections are in place or controls the mechanical lock or locks in order to prevent disconnection of machine 200 from service station 300. The machine control unit 210 may generate a signal indicative of the connection or connections being in place. In some embodiments, fluid/liquid connectors can only be connected after electrical connectors have been connected. In embodiments having only a single connection line and connector, this can be achieved, for example, using a specific geometry of a combined plug and socket assembly. In addition or alternatively, electrical or mechanical means can be employed. Similarly, the electrical connector cannot be disconnected as long as fluid/liquid connectors remain connected. In other embodiments, several connection lines and corresponding connectors may be connected in a specific predetermined sequence. In these embodiments, several lock mechanisms can be activated or deactivated depending upon whether specific connections have been established or disconnected (e.g. connection electrical lines before connecting fluid lines).

Upon connection of machine 200 to service station 300, it is ensured that no manual activation of machine functions, for example using a machine control panel, can occur. This can be achieved, for example, by disabling the machine control panel 212 upon connection of machine 200 to service station 300. As long a particular selected process is performed by service station 300, disconnection of machine 200 is prevented, for example using the above-described locking mechanisms. In some embodiments, where disconnection is not actively prevented, a check for the connection or connections being place can be performed continuously throughout the selected process and the process can be interrupted or stopped (e.g. aborted) upon removal of one or more connections. A process can also be aborted based on operator interaction. If the process is not prematurely aborted, control unit 310 of service station 300 performs the selected process until it is finished. An operator can abort a running process by selecting a particular function via user interface 312 of service station 300 or by activating a dedicated emergency-stop element (e.g. a mechanical switch prominently placed on or in the vicinity of service station 300. When a process has been finished or when it has been aborted, control unit 310 prepares machine 200 and service station 300 for disconnection (e.g. releasing pressure and/or excess liquids in fluid/liquid lines, removing charging current from components) and deactivates the mechanical lock or locks on the connector(s). In some embodiments, where disconnection is not actively prevented, mechanical measures (e.g. check valves for fluid connections) can be provided for potential disconnection of a connector during an ongoing process. Disconnection is performed in accordance with the respective protocol (e.g. disconnection of fluid/liquid connectors first, and subsequently disconnection of electrical connectors or vice-versa), if the connections are controlled by the service station 300. Upon disconnection of the service connection, machine control panel 212 is enabled. This can be controlled by the control unit of the service station being configured to send a corresponding control signal to the machine control unit (e.g. wirelessly) or by the machine control unit being configured to monitor the connection and detecting a removal of the connection. Upon removal of the connection or upon receiving of the corresponding control signal, the machine control unit re-enables the machine user interface.

Figure 6:
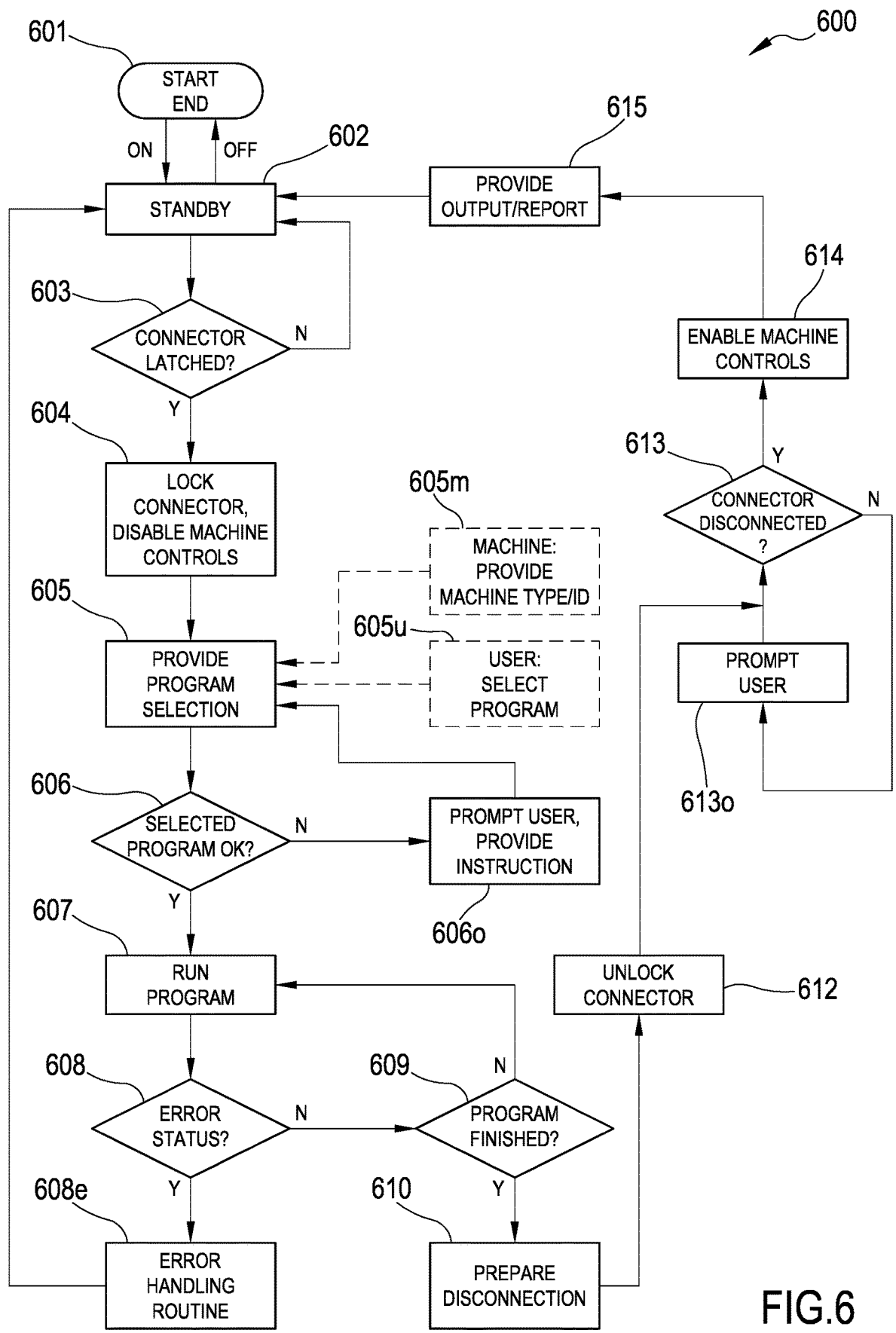
FIG. 6 shows a flow chart illustrating a general operating process of the service station allowing the execution of a number of different service processes.

FIG. 6 shows a flow chart illustrating a general operating process of the service station allowing the execution of a number of different service processes. Generally, process 600 starts and ends when service station 300 is switched on (e.g. put in standby mode, ready for service) and switched off (e.g. leaving standby mode, temporarily shutting down the service station), respectively. In step 602 service station 300 is in standby mode, either awaiting connection of a machine 200 or awaiting to be switched off. In step 603, a proper connection to machine 200 is checked. Only if a proper connection can be detected (e.g. requiring a service assembly 400 to be connected and/or the connector being latched), then service station 300 can proceed to step 604. If no proper connection can be detected, service station 300 remains in standby mode (step 602). For clarity, actions performed are described with respect to the service station (and not with respect to the control unit thereof). It is understood that the control unit is programmed to perform the process steps and that corresponding input/output components (e.g. touch screen, keyboard, etc.) are provided.

In step 604, service station 300 locks service assembly 400 in order to prevent (unintentional) removal of the connection between service station 300 and machine 200 while service or maintenance is in progress. At the same time, machine control panel 212 is disabled, in order to prevent any user interference via machine control panel 212. One key issue is that machine 200 remains stationary and cannot be moved by a user either intentionally or unintentionally, as long as machine 200 is connected to service station 300. Disabling machine control panel 212 effectively prevents any user interference via machine control panel 212. Machine control panel 212 is only disabled after a specific series of steps, which ensure that service/maintenance has been completed (or aborted in a controlled manner) and that the connection has been removed (see steps 610 to 615 below).

In step 605, service station 300 provides a number of possible service programs based on the type and status of the particular machine 200 connected. Step 605m denotes that service station 300 reads the corresponding data from machine 200 (e.g. by retrieving data stored in data exchange device 1000) or otherwise acquires the information. In an alternative embodiment, in which service station 300 does not or cannot automatically determine the type of machine 200, the machine type can be input by a user via a user interface 312 integrated into service station 300. In step 605u an operator can select a program corresponding to the desired service or maintenance to be performed and in line with the requirements of machine 200. Service and maintenance programs can pertain to simple refilling of fresh liquids and discharge of used liquids, to more extensive filling, discharge, and cleaning/rinsing, to comprehensive maintenance including de-scaling, extensive cleaning/rinsing, charging, etc. Steps 605m and 605u are input steps allowing a user to provide operating parameters to service station 300.

The process continues at step 606, where service station may perform an integrity check whether the type of machine 200 and the status of machine 200 are within the requirements of the selected service program. This step is optional since in preferred embodiments service station 300 only provides a selection of service/maintenance programs that are suitable for machine 200 currently connected and, thus, prevents at an early stage any conflicting input or selection made by a user. If any inconsistencies are determined or if any service parameters are not within operational limits, service station 300 prompts the user in step 606o to make changes to the selection or to cancel the request. If the type of machine 200 and the status of machine 200 are compatible with the selected service program, service station 300 proceeds to run the selected service program.

In step 607 service station 300 runs the program corresponding to the selected service process. Particular examples of these processes are described further below with respect to FIGS. 7 to 9. While the program corresponding to the selected service process is run, service station 300 periodically checks a potential error status in step 608 and—if necessary—terminates the program prematurely. Such error status can include, but is not limited to: battery failure, charging unit failure, leakage detection, pump malfunction, blockage of a line, severing of data communication, etc. If an error occurs, service station 300 enters an error handling routine, depending upon the type of error occurred. Otherwise, the program is run until the service process in finished in step 609. It is understood that the error handling routine can include one or more steps corresponding to steps 610 to 615 in order to sever a connection between service station 300 and machine 200 in a controlled manner.

Upon termination of the program, if the connections are controlled by the service station 300, service station 300 prepares the disconnection of connector plug 401 from connector socket 402 in step 610. In this step, for example, pressure and excess liquids are removed from lines 305/205 and/or 306/206. Further, established data communication can be shut down. When these preparations are completed, the lock on service assembly 400 is released in step 612. In step 613, service station 300 checks whether connector 401 has been disconnected and, if not, a corresponding output message is generated in step 613o in order to signal an operator that service/maintenance has been concluded and that connector 401 should be removed. Upon disconnection of connector 401, machine control panel 212 is enabled again in step 614. A corresponding output and/or report can optionally be provided in step 615. After steps 608e and/or 614/615 service station 300 returns to standby mode in step 602.

Figure 6A:
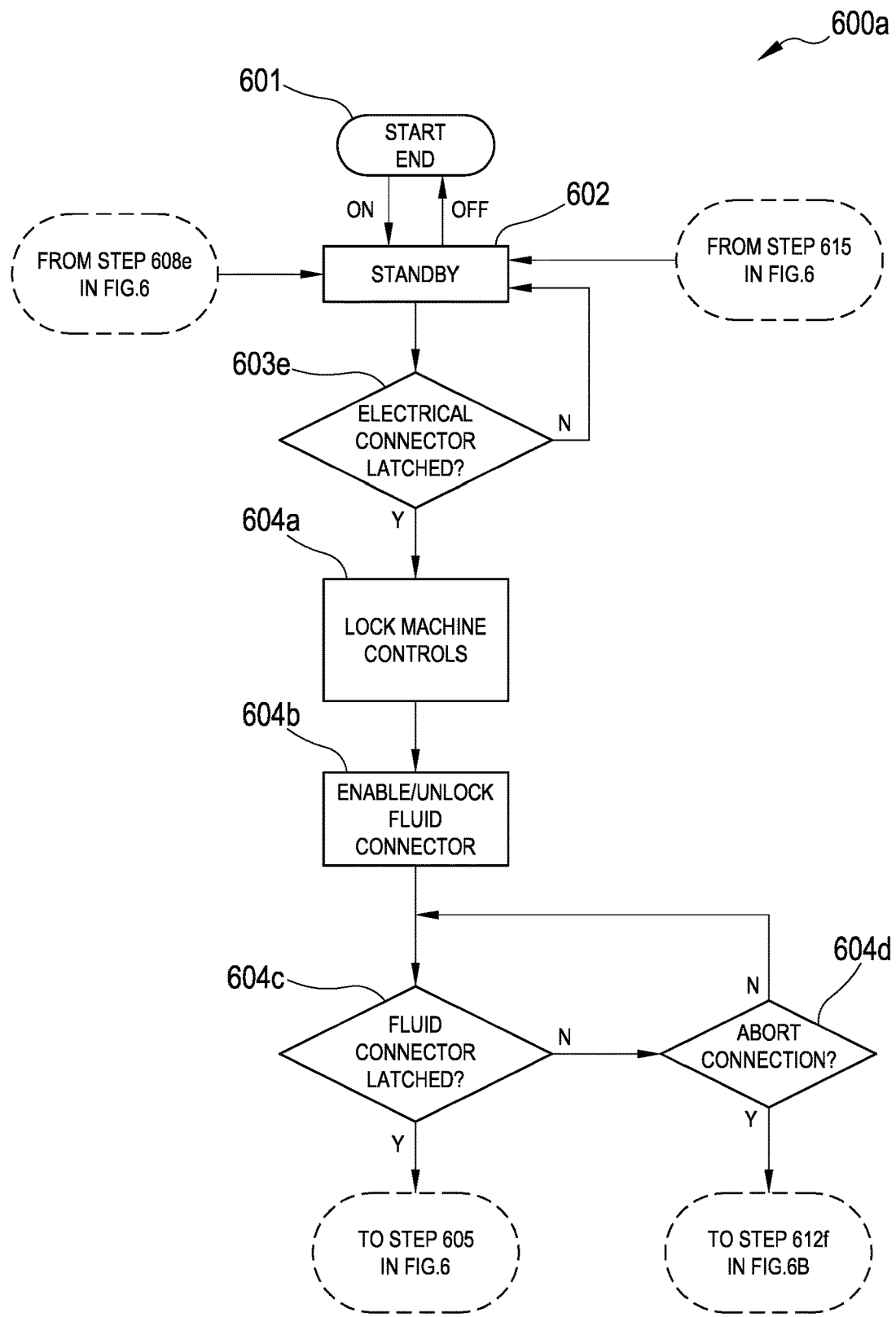
FIGS. 6A and 6B each show a flow chart illustrating parts of the general operating process of FIG. 6 adapted for use of a service station having two separate connection lines and corresponding connectors, for example those shown in FIGS. 5A and 5B.
Figure 6B:
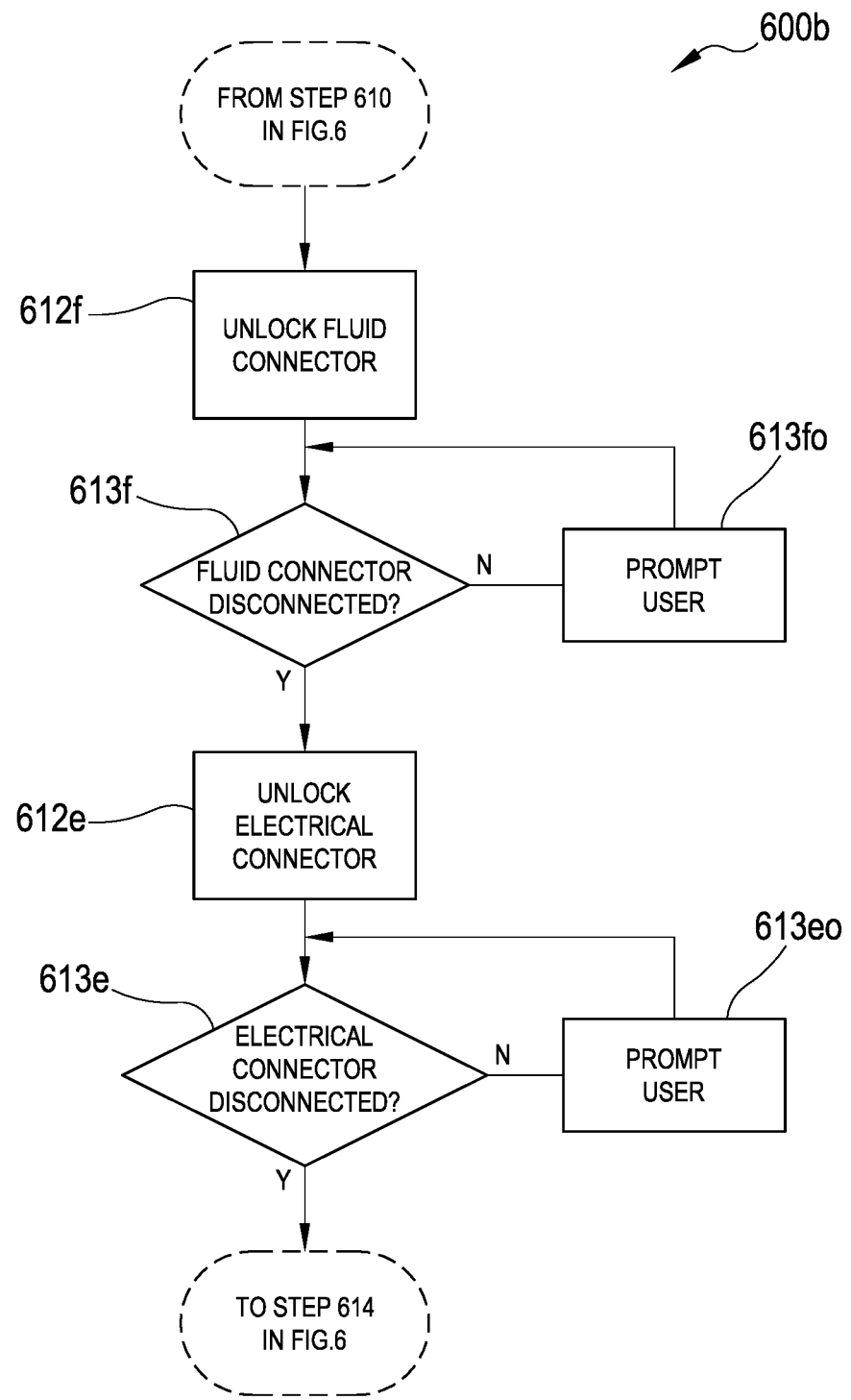

FIGS. 6A and 6B each show a flow chart illustrating parts of the general operating process of FIG. 6 adapted for use of a service station 300 having two separate connection lines 350e and 350f and corresponding connectors 401e and 401f (see FIGS. 5A and 5B). In FIG. 6A, steps 601 and 602 correspond to steps 601 and 602 as shown in FIG. 6. It is understood that identical steps have the same reference numbers in FIGS. 6, 6A, and 6B. In step 603e, service station 300 checks whether electrical connector 401e has been connected and/or latched. In step 604a machine control panel 212 is disabled or locked (see step 604 in FIG. 6). In step 604b, the corresponding socket for receiving connector 401f is enabled or unlocked, thereby preventing any connection of fluid/liquid connector 401f prior to connection of electrical connector 401e and prior to disabling machine control panel 212. In step 604c, service station 300 checks whether fluid/liquid connector 401f is connected and/or latched. Optionally, the connection can be aborted in step 604d, upon which the process continues at step 612f of FIG. 6B. Otherwise, if the fluid/liquid connector 401f is connected and/or latched, the process continues at step 605 in FIG. 6.

Step 612f in FIG. 6B starts after preparation of disconnection in step 610 in FIG. 6, if the connections are controlled by the service station 300. In step 612f, service station 300 unlocks fluid/liquid connector 401f, so that an operator can remove the connector from the corresponding socket. In step 613f, service station 300 checks whether the fluid/liquid connection has been severed, i.e. that connector 401f has been removed. If this cannot be determined, then service station 300 provides a corresponding output or signal in step 613fo in order to prompt the operator or user to remove connector 401f. As soon as the fluid/liquid connection is severed, service station 300 unlocks electrical connector 401e in step 612e, so that an operator can remove the connector from the corresponding socket. In step 613e, service station 300 checks whether the electrical connection has been severed, i.e. that connector 401e has been removed. If this cannot be determined, then service station 300 provides a corresponding output or signal in step 613eo in order to prompt the operator or user to remove connector 401e. Once electrical connector 401e has been disconnected, the process continues at step 614 in FIG. 6. It is noted that, analogous to FIGS. 6, 6A, and 6B, further alternative embodiments, for example having three or more service lines and a corresponding number of connectors, can be operated in a similar manner. It is understood that a predetermined sequence for connecting the respective connectors has to be followed and that the service station controls respective locking mechanisms in order to enforce the predetermined sequence. A corresponding sequence for disconnecting can be enforced as well, typically reversing the order of connectors during disconnection, such that if a connector must be connected first, the same connector must be disconnected last. In other embodiments, it might be desirable to connect fluid lines first and verify that no leaks exist before connecting electrical lines. In still other embodiments, it might be desirable to first connect and first disconnect electrical lines to minimize the risk of exposing electrical terminals to liquid spills that might occur while connecting and disconnecting a fluid line. Different combinations of connect and disconnect sequences can be implemented based on particular industrial environments, work protocols, and the extent to which control unit 310 controls or locks features of machine 200 during servicing.

FIG. 7 shows a flow chart illustrating a process for refilling a cleaning machine. In step 702, process 700 starts. In step 704, an output indicating the selected service process is displayed (e.g. "Refilling in progress . . . "). It is noted that the machine control panel 212 has already been disabled upon connection of service assembly 400, in order to prevent any interference with the service process by a user via the machine control panel 212 (see process 600 above). During service/maintenance, service station 300, more specifically control unit 310 of service station 300, obtains control over machine control unit 210 and is configured to control individual components of machine 200, for example, valves 291v or 296v.

In step 706, the used solution tank 245 is drained. In some embodiments, valve 296v is actuated in order to allow for the solution present in tank 245 to drain into trough 340. The draining progress is either detected using a corresponding sensor indicative of the liquid level present in tank 245. Alternatively, the progress is based on the time necessary to empty a full tank.

After detecting that tank 245 has been emptied, or upon expiry of a time limit, pump 362 is controlled to supply high pressure rinsing/cleaning solution in step 708 order to facilitate flushing and/or cleaning of nozzles in used solution tank 245. This rinsing and/or cleaning can be performed for a predetermined period of time, in a single cycle or in several cycles steered by valves (not shown), depending, for example, upon machine type and/or tank size. After rinsing/cleaning, valve 296v closes, optionally after a predetermined delay.

In step 710, cleaning solution tank 290 is filled. As described above, filling of tank 290 can be performed in parallel (if machine 200 is provided with separate independent tanks) or sequentially (if machine 200 is provided with combined tanks). In some embodiments in which machine 200 has combined tanks 290/245, draining and re-filling can be done with a suitable overlap (i.e. filling starts before draining/rinsing ends), in order to reduce service time. Filling automatically stops when cleaning solution tank 290 is full. This is either controlled by a float-operated valve or by electrically operated valve controlled by service station 300 based on a corresponding sensor signal.

As described above with respect to FIG. 1, a predetermined amount of a chemical component (e.g. detergent, cleaning agent) is supplied to the cleaning solution during the re-filling of tank 290 or as a separate step 712. Process 700 ends at step 714.

FIG. 8 shows a flow chart illustrating a maintenance process for a cleaning machine. In step 802, process 800 starts. In step 804, an output indicating the selected service process is displayed (e.g. "Maintenance in progress . . . "). It is noted that the machine control panel has already been disabled upon connection of service assembly 400, in order to prevent any interference with the service process by a user via the machine control panel 212.

In step 806, charging unit 320 may supply a charging current to batteries 222 based on a corresponding charging profile. In some embodiments, charging is not performed before completion of steps 808 to 816. In these embodiments, the handling of liquids precedes the charging, which is then only performed at step 818 (see below). Irrespective of whether charging is performed at/from step 806 or step 818, as described above, different types of machines having different types of batteries 222 require different kinds of charging profiles (including, e.g., corresponding charging currents). Control unit 310 can be configured to check for compatibility of the charging profile with the charging unit 320 and/or the battery 222, including the machine status (e.g. low-voltage, temperatures warning, etc.) and provides a corresponding charging current upon determining that all parameters are met. Generally, however, service station 300 detects the type of machine 200 upon connection (or shortly before or after) and selects the correct charging profile based on the battery type and/or machine type. In some embodiments, machine 200 provides information about the type or ID of machine 200 or battery 222 installed in the machine. This information can be stored by service station 300 in order to be available upon later connection of the same machine 200. In other embodiments, the battery type of machine 200 is provided in some other way (e.g. user input, data stored in service station 300).

In step 808, the used solution tank 245 is drained. In some embodiments, valve 296v is actuated in order to allow for the solution present in tank 245 to drain into trough 340. The draining progress is either detected using a corresponding sensor indicative of the liquid level present in tank 245. Alternatively, the progress based on the time necessary to empty a full tank.

After detecting that tank 245 has been emptied, or upon expiry of a time limit, pump 362 is controlled to supply high pressure rinsing/cleaning solution in step 810 order to facilitate flushing and/or cleaning with nozzles or other suitable means installed in used solution tank 245. This rinsing and/or cleaning is performed for a predetermined period of time, in a single cycle or in several cycles steered by valves (not shown), depending, for example, upon machine type and/or tank size. After rinsing/cleaning, valve 296v closes, optionally after a predetermined delay.

In step 812, further components of machine 200 can be cleaned, for example: cleaning of the squeegee with nozzles or other suitable means installed in the squeegee assembly 232, cleaning with nozzles or other suitable means installed in the brush cover, cleaning with nozzles or other suitable means for backwashing of suction tube(s) and fine-mesh protection filter at suction motor, and (optionally) cleaning with nozzles or other suitable means to clean solution tank 290. Nozzles can be activated in parallel or sequentially for a varying period of time in order to achieve the desired rinsing/cleaning result.

In step 814, cleaning solution tank 290 is filled. As described above, filling of tank 290 can be performed in parallel (if machine 200 is provided with separate independent tanks) or sequentially (if machine 200 is provided with combined tanks). In some embodiments in which machine 200 has combined tanks 290/245, draining and re-filling can be done with a suitable overlap (i.e. filling starts before draining/rinsing ends), in order to reduce service time. Filling automatically stops when cleaning solution tank 290 is full. This is either controlled by a float-operated valve or by electrically operated valve controlled by service station 300 based on a corresponding sensor signal.

As described above with respect to FIG. 1, a predetermined amount of a chemical component (e.g. detergent, cleaning agent) is supplied to the cleaning solution during the re-filling of tank 290 or as a separate step 816. Maintenance of machine 200 essentially ends at step 816, notwithstanding the fact that further charging might be necessary. After step 816, machine 200 is ready for operation, albeit not necessarily having fully charged battery 222.

In step 818, charging unit 320 may start charging (see above) or further monitor the charging process of battery 222. For example, charging unit 320 may check the status of battery 222 and determine whether further charging is required. Process 800 ends at step 820.

FIG. 9 shows a flow chart illustrating a process for servicing a cleaning machine. This process is used if a full machine service is to be performed or if the machine is decommissioned for an extended period of time (e.g. several days or longer). In step 902, process 900 starts. In step 904, an output indicating the selected service process is displayed (e.g. "Service in progress . . . "). At the same time, power supply to the machine control unit is cut, if this has not already been done upon locking of service assembly 400 (see process 600 above).

In step 906, charging unit 320 may supply a charging current to batteries 222, based on a corresponding charging profile, in order to start charging. In some embodiments and as described above with respect to process 800 above, charging is not performed before completion of steps 908 to 922. In these embodiments, the handling of liquids precedes the charging, which is then only performed at step 924 (see below). Irrespective of whether charging is performed at/from step 906 or step 924, s described above, different types of machines having different types of batteries 222 require different kinds of charging profiles. Control unit 310 is configured to check for compatibility of the charging profile, the charging unit 320, and the battery 222, including the machines status (e.g. low-voltage, temperatures warning, etc.) and provides corresponding charging current upon determining that all parameters are met.

In step 908, the used solution tank 245 is drained. In some embodiments, valve 296v is actuated in order to allow for the solution present in tank 245 to drain into trough 340. The draining progress is either detected using a corresponding sensor indicative of the liquid level present in tank 245. Alternatively, the progress based on the time necessary to empty a full tank.

After detecting that tank 245 has been emptied, or upon expiry of a time limit, pump 362 is controlled to supply high pressure rinsing/cleaning solution in step 910 order to facilitate flushing and/or cleaning with nozzles or other suitable means installed in used solution tank 245. This rinsing and/or cleaning is performed for a predetermined period of time, in a single cycle or in several cycles steered by valves (not shown), depending, for example, upon machine type and/or tank size (see above). After rinsing/cleaning, valve 296v closes, optionally after a predetermined delay.

In step 912, further components of machine 200 can be cleaned, for example: cleaning with nozzles or other suitable means installed in the squeegee assembly 232, cleaning with nozzles or other suitable means installed in the brush cover, cleaning with nozzles or other suitable means for backwashing of suction tube(s) and fine-mesh protection filter at suction motor, and (optionally) cleaning with nozzles or other suitable means to clean solution tank 290. Nozzles can be activated in parallel or sequentially for a varying period of time in order to achieve the desired rinsing/cleaning result.

In step 914, cleaning solution tank 290 is emptied. In the described service process 900, residual liquid is drained from solution tank 290 in order to be able to perform a more extensive rinsing, cleaning, and de-scaling process of tank 290. To this aim, tank 290 is emptied completely.

In step 916, tank 290 is filled up to a predetermined level in order to prepare the rinsing/cleaning/de-scaling solution. Similar to what is described above with respect to FIG. 1, a predetermined amount of a chemical component (e.g. detergent, cleaning agent, de-scaling gent) is supplied to the cleaning solution during the re-filling of tank 290 or as a separate step 918.

The cleaning and/or de-scaling agent is then left to react within tank 290 in a cleaning/de-scaling process. In some embodiments, several repetitions of draining and re-filling tank 290 using corresponding solutions (e.g. cleaning, then de-scaling, then rinsing) may be necessary. Performing and/or repeating any of these steps is done in step 920. The descaling process might include a predetermined time of activation of pump(s) and/or valve(s) in the machine in order to reach all areas of the water system (see further details below).

In step 922, a blower configured to dry different components of machine 200 (e.g. tanks, lines, filters, etc.) can be activated. This is particularly important, whenever machine 200 is decommissioned for a longer period of time (e.g. several days or longer). If machine 200 is reactivated for use after having been decommissioned for an extended period of time, any one of the above processes can be used (e.g. refill, maintenance, service).

In step 924, control unit 310 may, if required, activate the charging process (see above) and/or further monitor the status of battery 222 while charging. In some embodiments charging is prevented if battery 222 is substantially fully charged, for example holding 95% or more of the maximum charge. In the embodiment having more than one service line and connector, first the fluid line and connector may have to be disconnected. Subsequently, if the service station 300 controls the connection or connections, the lock on the electrical line and connector is released, enabling disconnection thereof. Process 900 ends at step 926.

During initial installation, in some embodiments, service station 300 can be programmed with several parameters characterizing the installation site. These parameters include, for example, water hardness. Control unit 300 is configured to compute several service parameters using the installation site parameters. For example, based on water hardness and machine type, corresponding de-scaling schedules can be determined. Hard water can lead to premature malfunctions or other failures, for example relating to pumps, valves, and nozzles, if de-scaling is not done in prescribed intervals according to the water hardness.

Manual scheduling of de-scaling can be done in several ways. The most basic process is merely based on instructions listed in the user manual of a machine 200, detailing to operators at which intervals, depending on water hardness in the region, de-scaling is to be performed. There are no mechanisms in place to confirm that the respective schedule is being followed, or to determine that a de-scaling process has been performed correctly.

Alternatively, installation site parameters can be programmed into the machine control unit 210, which can calculate, based on operating parameters (e.g. operating hours, amounts of liquid processed, etc.), when de-scaling is necessary. A suitable indicator (e.g. warning light) can be activated once control unit 210 has determined that de-scaling is to be performed. Again, there are no mechanisms in place to confirm that the respective schedule is being followed, or to determine that a de-scaling process has been performed correctly. In some embodiments, the date and number of de-scaling processed performed can be tracked and stored in a memory component (e.g. in machine control unit 210 and/or in data exchange device 1000).

In another variant, parameters further include the type and amount of chemicals used, in addition to water hardness. Machine control unit 210 can then calculate, based operating parameters (e.g. operating hours, types and amounts of chemicals/liquids processed, etc.), when de-scaling is necessary. The individual composition of the chemicals used, however, needs to be known. This can be achieved, for example, when only prescribed chemicals are used (e.g. TASKI chemicals).

Without a service station, all the above-mentioned de-scaling scenarios require user interaction, for example activation of de-scaling by means of pressing a combination of switches on an operating panel of machine 200 or by means of selecting and/or activating a software program. The steps are either manually executed or performed by machine control unit 200 based on stored information. The steps can include the following. Providing the fresh solution tank 290 with distinct level of water by either draining or filling the tank 290. The exact amount depends upon the size of tank 290, the water supply system, and/or other factors. Adding a predetermined dose of acid (e.g. phosphoric acid) in the range of between 2% and 50% depending upon the type of acid used and on the operating conditions (e.g. installation site parameters). Activating water flow in machine 200 in order to distribute the water/acid solution into the system and to all components (e.g. valves, couplings, lines, nozzles). Stopping water flow in order to let de-scaling take place. Activating water flow again in order to rinse lime scale and other particles, and to move fresh water/acid solution to the components. If necessary, repeat the previous steps until all water/acid solution has been used up. Refill tank 290 with clear water for rinsing the system. Activate water flow until all water/acid solution is rinsed from system (e.g. exiting at tools couplings, drains, etc.). Confirming end of rinsing and end of de-scaling process.

This manual process (or assisted by machine control unit 210) requires skilled operators, corresponding working time, and the manual operations necessary. Thus, such procedures are relatively costly and error-prone. Service station 300 can be programmed to perform de-scaling processes during the above-described refill, service, and/or maintenance processes. De-scaling can, for example, be integrated into the steps 812/814 and 916-920 of processes 800 and 900, respectively. It is noted that de-scaling can be done with respect to any of the processes 800 and 900—regardless of whether an exclusive de-scaling step has been described above with respect to FIG. 8 or 9. It is understood that the step of filling tank 290 either with fresh water or with cleaning solution can be preceded by a process of de-scaling as described above. The process can be automated based on control unit 310 of service station 300 being in communication with data exchange device 1000 of machine 200.

As describe above, machine control panel 212 is disabled as soon as a connection between service station 300 and machine 200 is established and, thus, before service is performed (e.g. upon latching or locking of service assembly 400). However, actuating valves or pumps of machine 200 during servicing, as described above (e.g. in order to drain tanks or to run pumps) requires some form of communication between machine control unit 210 and control unit 310.

The discharging scheme is managed by machine control unit 210. Machine control unit 210 be programmed or equipped with several discharging schemes. On delivery of machine 200, a general or default scheme is activated. Changes to the schemes have to be programmed on-site, for example by service personnel using a portable computer, a service data connection to the machine, and a corresponding service application running on the portable computer.

Wrong or incorrect battery management (e.g. overcharging or deep discharging) can have detrimental effects on battery life, capacity, and/or performance, and a mechanism addressing the above problems is required. A simple approach would be having the machine control and/or power units monitor and record at least the number of charging cycles and the charging time, as it is also connected to the batteries. Such an approach, however, can be in conflict with local regulations (e.g. EU regulations on the use of charging system in such machines). Such regulations may request that during charging electrical power to the machine must be interrupted or—when using flooded batteries or lead-acid batteries—all poles must be disconnected. Monitoring or control of the charging process by the machine control unit 210, therefore, becomes impossible.

Another critical point is that control and/or power units in machines are typically surrounded by plastic components. In case that the control and/or power unit stays live during charging, a defect carries a remaining risk that the machine could catch fire while unobserved. As a consequence—for safety reasons—the entire electrical system in the machine should be disconnected from any power supply after switch-off, which means also during charging. Communication between both components therefore cannot be achieved if one of the components, here the machine control unit, is not powered. With the charger placed in the service station and (data-) connection between the machine 200 and the service-station 300 during servicing, fire risks are substantially reduced or prevented, and data of operations and charging are brought together. Remote data transfer can be achieved based on LAN, WLAN, or other suitable data communication means.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A service station for servicing machines, comprising:
a first inlet line including an electric conduit and configured to connect to a power source;
a second inlet line including a fluid conduit and configured to connect to a cleaning liquid source;
a control unit;
a charging unit electrically connected to the first inlet line and to the control unit, the charging unit being configured to provide a charging current;
a first flow controller fluidly connected to the second inlet line;
a first supply line electrically connected to the charging unit and configured to receive the charging current and to deliver the charging current to a first connector plug for providing the charging current to a machine to be serviced;
a second supply line fluidly connected to the first flow controller and to a second connector plug for providing cleaning liquid to the machine to be serviced;
wherein
the control unit is configured to:
control the first flow controller to cause delivery of cleaning liquid from the second inlet line to the second supply line; and
control the charging unit to supply the charging current to the first supply line.

2. The service station of claim 1, further comprising a service assembly comprising a first service connector plug configured to connect to a corresponding first service connector socket of the machine to be serviced.

3. The service station of claim 2, wherein the first service connector plug is configured to house the first connector plug and the second connector plug, and wherein the service assembly is configured to house the first supply line and the second supply line in a main supply conduit.

4. The service station of claim 2, wherein
the first connector plug is configured to connect to a first connector socket of the first service connector socket; and
the second connector plug is configured to connect to a second connector socket of the first service connector socket.

5. The service station of claim 4, wherein the first and second connector plugs are configured such that, when the service connector plug is connected to the service connector socket of the machine to be serviced, the first connector plug connects to the first connector socket before the second connector plug connects to the second connector socket.

6. The service station of claim 2, wherein
the service assembly comprises a second service connector plug configured to connect to a corresponding second service connector socket of a machine to be serviced;
the first service connector plug is configured to house the first connector plug and the second service connector plug is configured to house the second connector plug; and
the first supply line and the second supply line are configured as separate first and second supply conduits, the first supply line being operatively associated to the first service connector plug and the second supply line being operatively associated to the second connector plug.

7. The service station of claim 6, further comprising a first locking mechanism configured to selectively allow or prevent connection and disconnection of the first service connector plug; wherein
the control unit is configured to control the first locking mechanism to:
prevent disconnection of the first service connector plug when the second service connector plug is connected, and
allow connection and disconnection of the first service connector plug when the second service connector plug is not connected.

8. The service station of claim 6, further comprising a second locking mechanism configured to selectively allow or prevent connection and disconnection of the second service connector plug;
wherein
the control unit is configured to control the second locking mechanism to:
prevent connection of the second service connector plug when the first service connector plug is not connected, and
allow connection and disconnection of the second service connector plug when the first service connector plug is connected.

9. The service station of claim 1, wherein the first flow controller comprises a valve configured to put the second inlet line and the second supply line into fluid communication; and wherein the control unit controls the first flow controller to cause delivery of cleaning liquid from the second inlet line to the second supply line by actuating the valve to allow flow of liquid based on a pressure differential between a pressure in the second inlet line and a pressure in the second supply line.

10. The service station of claim 1, wherein the first flow controller comprises a first pump configured to deliver cleaning liquid from the second inlet line to the second supply line; and wherein the control unit controls the first flow controller to cause delivery of cleaning liquid from the second inlet line to the second supply line by actuating the first pump to deliver liquid from the second inlet line to the second supply line.

11. The service station of claim 1, further comprising a cleaning agent container configured to receive a cleaning agent; wherein
the first flow controller is further fluidly connected to the cleaning agent container; and
the control unit is further configured to control the first flow controller to add a predetermined amount of cleaning agent to the cleaning liquid provided to the second supply line.

12. The service station of claim 1, further comprising a supply fluid flow controller configured to selectively prevent fluid flow through the second supply line if the second connector plug is not connected to a corresponding second connector socket of the machine to be serviced, optionally the supply fluid flow controller being operatively associated with one of the second connector plug and the second supply line.

13. The service station of claim 1, further comprising:
a first outlet line including a fluid conduit and configured to connect to a drain; and
a receptacle fluidly connected to the first outlet line and configured to receive cleaning liquid discharged from the machine to be serviced.

14. The service station of claim 1, further comprising:
a second flow controller fluidly connected to the second inlet line; wherein
the service assembly further includes:
a third supply line fluidly connected to the second flow controller and to a third connector plug for providing cleaning liquid to the machine to be serviced; and
wherein
the control unit is further configured to:
control the second flow controller to cause delivery of cleaning liquid from the second inlet line to the third supply line.

15. The service station of claim 14, wherein the control unit is further configured to:
control the first flow controller to provide cleaning liquid to the second supply line at a first pressure;
control the second flow controller to provide cleaning liquid to the third supply line at a second pressure; and
wherein
the second pressure is higher than the first pressure.

16. The service station of claim 14, wherein
the service assembly further includes a fourth supply line connected to a fourth connector plug, the control unit being connected to the fourth supply line, the fourth supply line being configured to enable data communication between the control unit and the machine to be serviced.

17. The service station of claim 1, further comprising a wireless communications unit; wherein the control unit is connected to the wireless communications unit, the wireless communications unit being configured to enable data communication between the control unit and the machine to be serviced.

18. A machine for cleaning floor surfaces, comprising:
a machine control unit;
a machine user interface;
a battery;
a first container configured to receive cleaning liquid, the first container fluidly connected to a first discharge line, the first discharge line being configured to discharge fluid from the first container;
a first discharge flow controller arranged on the first discharge line and configured to selectively enable and disable fluid flow through the first discharge line;
a second container configured to receive used cleaning liquid, the second container fluidly connected to a second discharge line, the second discharge line being configured to discharge fluid from the second container; a second discharge flow controller arranged on the second discharge line and configured to selectively enable and disable fluid flow through the second discharge line;
a first connector socket connected to a first service line, the first service line being electrically connected to the battery and configured to provide a charging current received at the first connector socket to the battery; and
a second connector socket connected to a second service line, the second service line being fluidly connected to the first container and configured to provide a cleaning liquid received at the second connector socket to the first container; wherein
the machine control unit is configured to:
determine whether a first service connector plug is connected to the first service connector socket, and, when a connection has been determined, to disable the machine user interface;

receive a control signal from the service station; and control, based on the control signal, one or more of:
- the first discharge flow controller,
- the second discharge flow controller,
- the machine user interface.

19. A connection system for providing operating supplies to a machine to be serviced, the connection system comprising:
- a first connector plug configured to connect to a corresponding first connector socket of a machine to be serviced;
- a second connector plug configured to connect to a corresponding second connector socket of the machine to be serviced;
- a first supply line connected to the first connector plug and configured to provide a charging current to the machine to be serviced;
- a second supply line connected to the second connector plug and configured to provide cleaning liquid to the machine to be serviced.

20. A method for servicing a machine to be serviced using a service station, the machine to be serviced comprising:
- a first service connector socket;
- a machine control unit;
- a machine user interface connected to the machine control unit;
- a first container configured to receive cleaning liquid;
- a second container configured to receive used cleaning liquid, the second container being fluidly connected to a drain line configured to discharge used cleaning liquid from the second container, the drain line including a second drain flow controller configured to regulate flow of liquid through the drain line;

the service station comprising:
- a first service connector plug;
- a control unit;
- a first flow controller fluidly connected to a second inlet line and configured to supply cleaning liquid to the first service connector plug;

the method comprising the steps of:
- determining, at the control unit, that the first service connector plug is connected to the first service connector socket and disabling the machine user interface when a connection has been determined;
- receiving, at the control unit, a selected service process;
- performing, by the control unit, a series of service steps based on the selected service process;
- determining, at the control unit, whether all steps of the series of steps have been performed;
- preparing, by the control unit, the disconnection of the service connector plug and the service connector socket and enabling the machine user interface when a disconnection has been determined.

* * * * *